US006673407B2

(12) United States Patent
Hara et al.

(10) Patent No.: US 6,673,407 B2

(45) Date of Patent: Jan. 6, 2004

(54) SEMICONDUCTIVE MEMBER, SEMICONDUCTIVE BELT, SEMICONDUCTIVE ROLL, AND IMAGE FORMATION APPARATUS

(75) Inventors: Yukio Hara, Minamiashigara (JP); Shoichi Morita, Minamiashigara (JP); Masuo Kuroda, Hiratsuka (JP); Jiro Watanabe, Hiratsuka (JP)

(73) Assignees: Fuji Xerox Co., Ltd., Tokyo (JP); The Yokohama Rubber Co., Ltd., Tokyo (JP)

(*) Notice: Subject to any disclaimer, the term of this patent is extended or adjusted under 35 U.S.C. 154(b) by 179 days.

(21) Appl. No.: 09/749,581

(22) Filed: Dec. 28, 2000

(65) Prior Publication Data

US 2001/0026709 A1 Oct. 4, 2001

(30) Foreign Application Priority Data

| | | | |
|---|---|---|---|
| Jan. 7, 2000 | (JP) | ....................................... | 2000-005886 |
| Jan. 7, 2000 | (JP) | ....................................... | 2000-005888 |
| Jan. 7, 2000 | (JP) | ....................................... | 2000-005917 |
| Jan. 7, 2000 | (JP) | ....................................... | 2000-005918 |
| Dec. 18, 2000 | (JP) | ....................................... | 2000-384066 |

(51) Int. Cl.[7] .................................................. B32B 1/08

(52) U.S. Cl. .................. 428/36.9; 428/36.92; 428/323; 428/327; 428/331; 428/473.5; 399/307; 522/162; 522/164

(58) Field of Search ............................ 428/36.92, 36.9, 428/323, 327, 331, 473.5; 399/307; 522/162, 164

(56) References Cited

U.S. PATENT DOCUMENTS

| | | | | | |
|---|---|---|---|---|---|
| 6,118,968 | A | * | 9/2000 | Schlueter, Jr. et al. ...... | 399/333 |
| 6,281,324 | B1 | * | 8/2001 | Nakamura et al. .......... | 528/170 |
| 6,352,750 | B1 | * | 3/2002 | Kanetake .................... | 428/369 |

FOREIGN PATENT DOCUMENTS

| | | |
|---|---|---|
| JP | A 10-254215 | 9/1998 |
| JP | A 11-45013 | 2/1999 |

* cited by examiner

*Primary Examiner*—Leszek B Kiliman
(74) *Attorney, Agent, or Firm*—Oliff & Berridge PLC

(57) ABSTRACT

A semiconductive member such as a semiconductive belt or a semiconductive roll used with an image formation apparatus has a portion formed of a thermoplastic elastomer composition comprising a thermoplastic resin 73 as a matrix and rubber particles 72 at least some of which have conductivity and at least some of which are cross-linked as domain.

31 Claims, 24 Drawing Sheets

TABLE 1

| | RUBBER BLEND 1 | RUBBER BLEND 2 | RUBBER BLEND 3 | RUBBER BLEND 4 | RUBBER BLEND 5 | RUBBER BLEND 6 | RUBBER BLEND 7 |
|---|---|---|---|---|---|---|---|
| EPDM | 100 | 100 | 100 | 0 | 100 | 100 | 100 |
| MODIFIED IIR | 0 | 0 | 0 | 100 | 0 | 0 | 0 |
| LIQUID RUBBER | 50 | 50 | 50 | 50 | 50 | 50 | 50 |
| ZINC OXIDE | 5 | 5 | 5 | 5 | 5 | 5 | 5 |
| STEARIC ACID | 1 | 1 | 1 | 1 | 1 | 1 | 1 |
| ANTIOXIDANT | 1.5 | 1.5 | 1.5 | 1.5 | 1.5 | 1.5 | 1.5 |
| KETJEN BLACK | 50 | 30 | 5 | 50 | 10 | 70 | 30 |
| GPF | 20 | 40 | 65 | 20 | 60 | 0 | 0 |
| FT | 0 | 0 | 0 | 0 | 0 | 0 | 40 (X) |
| PHENOL BROMIDE | 12 | 12 | 12 | 0 | 12 | 0 | 12 |
| VOLUME RESISTIVITY LOGΩ·cm | 3.4 | 5.6 | 9.7 (X) | 3.2 | 7.0 | 1.1 | 8.1 (X) |

TABLE 2

| | EXAMPLE 4 | CONTROL EXAMPLE 9 | EXAMPLE 5 | CONTROL EXAMPLE 10 | EXAMPLE 6 | CONTROL EXAMPLE 11 |
|---|---|---|---|---|---|---|
| SURFACE LAYER COAT | INCLUDED | NONE | INCLUDED | NONE | INCLUDED | NONE |
| AMORPHOUS NYLON 1 | 65 | 65 | | | | |
| AMORPHOUS NYLON 2 | | | | | | |
| PI | | | 80 | 80 | | |
| PES | | | | | | |
| PPS | | | | | | |
| PBT | | | | | 68 | 68 |
| PP | | | | | | |
| COMPATIBILIZING AGENT | 5 | 5 | 5 | 5 | 5 | 5 |
| RUBBER BLEND 1 | 35 | 35 | 20 | 20 | 32 | 32 |
| RUBBER BLEND 2 | | | | | | |
| RUBBER BLEND 3 | | | | | | |
| RUBBER BLEND 4 | | | | | | |
| RUBBER BLEND 5 | | | | | | |
| RUBBER BLEND 6 | | | | | | |
| RUBBER BLEND 7 | | | | | | |
| RUBBER VOLUME (VOL. %) | 36.6 | 36.6 | 23.2 | 23.2 | 36.4 | 36.4 |
| RUBBER/RESIN RATIO (VOL.) | 37/63 | 37/63 | 23/77 | 23/77 | 36/64 | 36/64 |
| RUBBER RESIN VISCOSITY RATIO | 1.1 | 1.1 | 0.5 | 0.5 | 1 | 1 |
| YOUNG'S MODULUS: MPa | 1000 | 1000 | 1800 | 1800 | 860 | 860 |
| VOLUME RESISTIVITY: LOGΩ cm | 9.8 | 8.1 | 12.1 | 11.9 | 10.5 | 9.7 |
| RESISTANCE VARIATIONS: ORDERS OF MAGNITUDE (LOGΩ cm) | 0.3 | 0.3 | 0.6 | 0.8 | 0.3 | 0.3 |
| WATER CONTACT ANGLE | 95 | 80 (X) | 90 | 80 (X) | 95 | 78 (X) |
| DIMENSION CHANGE (%) | NONE | NONE | NONE | NONE | NONE | NONE |
| DURABILITY | ○ | ○ | ○ | ○ | ○ | ○ |
| SECONDARY TRANSFER PROPERTY | ○ | △ | ○ | △ | ○ | △ |
| IMAGE QUALITY (DENSITY VARIATIONS) | ○ | ○ | ○ | ○ | ○ | ○ |

TABLE 3

| | EXAMPLE 1 | CONTROL EXAMPLE 6 | EXAMPLE 2 | CONTROL EXAMPLE 7 | EXAMPLE 3 | CONTROL EXAMPLE 8 |
|---|---|---|---|---|---|---|
| SURFACE LAYER COAT | INCLUDED | NONE | INCLUDED | NONE | INCLUDED | NONE |
| AMORPHOUS NYLON 1 | | | | | 65 | 65 |
| AMORPHOUS NYLON 2 | | | | | | |
| PI | | | | | | |
| PES | 80 | 80 | | | | |
| PPS | | | 68 | 68 | | |
| PBT | | | | | | |
| PP | | | | | | |
| COMPATIBILIZING AGENT | 5 | 5 | 5 | 5 | 5 | 5 |
| RUBBER BLEND 1 | 20 | 20 | 32 | 32 | | |
| RUBBER BLEND 2 | | | | | | |
| RUBBER BLEND 3 | | | | | | |
| RUBBER BLEND 4 | | | | | 35 | 35 |
| RUBBER BLEND 5 | | | | | | |
| RUBBER BLEND 6 | | | | | | |
| RUBBER BLEND 7 | | | | | | |
| RUBBER VOLUME (VOL. %) | 23.7 | 23.7 | 36.4 | 36.4 | 36.6 | 36.6 |
| RUBBER/RESIN RATIO (VOL.) | 24/76 | 24/76 | 36/64 | 36/64 | 37/63 | 37/63 |
| RUBBER RESIN VISCOSITY RATIO | 0.5 | 0.5 | 1.1 | 1.1 | 1.2 | 1.2 |
| YOUNG'S MODULUS: MPa | 1700 | 1700 | 1900 | 1900 | 1020 | 1020 |
| VOLUME RESISTIVITY: LOGΩ cm | 12.7 | 12.5 | 9.7 | 9.7 | 9.8 | 9.8 |
| RESISTANCE VARIATIONS: ORDERS OF MAGNITUDE (LOGΩ cm) | 0.6 | 0.9 | 0.3 | 0.3 | 0.4 | 0.4 |
| WATER CONTACT ANGLE | 90 | 80 (X) | 90 | 80 (X) | 90 | 80 (X) |
| DIMENSION CHANGE (%) | NONE | NONE | NONE | NONE | NONE | NONE |
| DURABILITY | O | O | O | O | O | O |
| SECONDARY TRANSFER PROPERTY | O | △ | O | △ | O | △ |
| IMAGE QUALITY (DENSITY VARIATIONS) | O | △ | O | O | O | O |

TABLE 4

| | CONTROL EXAMPLE 1 | CONTROL EXAMPLE 2 | CONTROL EXAMPLE 3 | CONTROL EXAMPLE 4 | CONTROL EXAMPLE 5 | CONTROL EXAMPLE 12 |
|---|---|---|---|---|---|---|
| SURFACE LAYER COAT | NONE | NONE | NONE | NONE | NONE | NONE |
| AMORPHOUS NYLON 1 | 15 | 95 | | 65 | | 80 |
| AMORPHOUS NYLON 2 | | | | | 65 | |
| PI | | | | | | |
| PES | | | | | | |
| PPS | | | | | | |
| PBT | | | | | | |
| PP | | | 60 | | | |
| COMPATIBILIZING AGENT | 5 | 5 | 5 | 5 | 5 | 5 |
| RUBBER BLEND 1 | 8.5 | 5 | 40 | | 35 | 20 |
| RUBBER BLEND 2 | | | | | | |
| RUBBER BLEND 3 | | | | 35 | | |
| RUBBER BLEND 4 | | | | | | |
| RUBBER BLEND 5 | | | | | | |
| RUBBER BLEND 6 | | | | | | |
| RUBBER BLEND 7 | | | | | | |
| RUBBER VOLUME (VOL. %) | 85.9 | 5.3 | 35.3 | 36.6 | 36.6 | 21.1 |
| RUBBER/RESIN RATIO (VOL.) | 86/14 | 5/95 | 35/65 | 37/63 | 37/63 | 21/79 |
| RUBBER RESIN VISCOSITY RATIO | 1.1 | 1.1 | 0.7 | 0.9 | 0.4 | 1.1 |
| YOUNG'S MODULUS: MPa | KNEADING IMPOSSIBLE | 2200 | 220 (X) | 1010 | 1020 | 1350 |
| VOLUME RESISTIVITY: LOGΩ cm | | 14.5 (X) | 10.1 | 14.6 (X) | 9.8 | 11.7 |
| RESISTANCE VARIATIONS: ORDERS OF MAGNITUDE (LOGΩ cm) | | 0.4 | 0.2 | 0.1 | 1.1 (X) | 0.4 |
| WATER CONTACT ANGLE | | – | – | – | – | 83 (X) |
| DIMENSION CHANGE (%) | | NONE | 3 | NONE | NONE | NONE |
| DURABILITY | | – | BELT EXTENSION | – | ○ | ○ |
| SECONDARY TRANSFER PROPERTY | | – | – | – | – | △ |
| IMAGE QUALITY (DENSITY VARIATIONS) | | – | ○ | – | ○ | ○ |

TABLE 5

| | EXAMPLE 7 | EXAMPLE 8 | EXAMPLE 9 | EXAMPLE 10 | EXAMPLE 11 | CONTROL EXAMPLE 13 |
|---|---|---|---|---|---|---|
| SURFACE LAYER COAT | INCLUDED | INCLUDED | INCLUDED | INCLUDED | INCLUDED | INCLUDED |
| AMORPHOUS NYLON 1 | 45 | 65 | | 90 | 80 | 80 |
| AMORPHOUS NYLON 2 | | | | | | |
| PI | | | 35 | | | |
| PES | | | | | | |
| PPS | | | | | | |
| PBT | | | | | | |
| PP | | | | | | |
| COMPATIBILIZING AGENT | 5 | 5 | 5 | 5 | 5 | 5 |
| RUBBER BLEND 1 | 55 | | 65 | 10 | | |
| RUBBER BLEND 2 | | | | | | |
| RUBBER BLEND 3 | | | | | | |
| RUBBER BLEND 4 | | | | | | |
| RUBBER BLEND 5 | | 35 | | | | |
| RUBBER BLEND 6 | | | | | 20 | |
| RUBBER BLEND 7 | | | | | | 20 |
| RUBBER VOLUME (VOL. %) | 56.7 | 56.7 | 69.5 | 10.6 | 23.7 | 23.7 |
| RUBBER/RESIN RATIO (VOL.) | 57/43 | 57/43 | 70/30 | 11/89 | 24/76 | 24/76 |
| RUBBER RESIN VISCOSITY RATIO | 1.1 | 1.0 | 0.5 | 1.1 | 1.4 | 0.9 |
| YOUNG'S MODULUS: MPa | 500 | 1000 | 550 | 1900 | 1700 | 1700 |
| VOLUME RESISTIVITY: LOGΩ cm | 8.1 | 11.1 | 7.1 | 12.9 | 10.1 | 14.3 (X) |
| RESISTANCE VARIATIONS: ORDERS OF MAGNITUDE (LOGΩ cm) | 0.3 | 0.4 | 0.8 | 0.5 | 0.5 | 0.2 |
| WATER CONTACT ANGLE | 95 | 95 | 95 | 95 | 95 | 95 |
| DIMENSION CHANGE (%) | NONE | NONE | NONE | NONE | NONE | NONE |
| DURABILITY | O | O | O | O | O | — |
| SECONDARY TRANSFER PROPERTY | O | O | O | O | O | — |
| IMAGE QUALITY (DENSITY VARIATIONS) | O | O | O | O | O | — |

TABLE 6

| | RUBBER BLEND 1 | RUBBER BLEND 2 | RUBBER BLEND 3 | RUBBER BLEND 4 |
|---|---|---|---|---|
| EPDM | 100 | 100 | 100 | |
| MODIFIED IIR | | | | 100 |
| LIQUID RUBBER | 50 | 50 | 50 | 50 |
| ZINC OXIDE | 5 | 5 | 5 | 5 |
| STEARIC ACID | 1 | 1 | 1 | 1 |
| ANTIOXIDANT | 1.5 | 1.5 | 1.5 | 1.5 |
| KETJEN BLACK | 50 | 30 | 5 | 50 |
| GPF | 20 | 40 | 65 | 20 |
| PHENOL BROMIDE | 12 | 12 | 12 | |
| VOLUME SPECIFIC RESISTANCE VALUE ($\Omega \cdot cm$) | 2.1E+03 | 3.6E+05 | 6.1E+09 | 1.8E+03 |

TABLE 7

| | CONTROL EXAMPLE 14 | EXAMPLE 12 | EXAMPLE 13 | EXAMPLE 14 | EXAMPLE 15 | EXAMPLE 16 | EXAMPLE 17 |
|---|---|---|---|---|---|---|---|
| AMORPHOUS NYLON 1 | 15 | 40 | 66 | | 80 | | |
| AMORPHOUS NYLON 2 | | | | 65 | | 80 | |
| PI | | | | | | | 80 |
| PES | | | | | | | |
| PPS | | | | | | | |
| PBT | | | | | | | |
| PP | | | | | | | |
| COMPATIBILIZING AGENT | 5 | 5 | 5 | 5 | 5 | 5 | 5 |
| RUBBER BLEND 1 | 85 | 60 | 35 | 35 | 20 | 20 | 20 |
| RUBBER BLEND 2 | | | | | | | |
| RUBBER BLEND 3 | | | | | | | |
| RUBBER BLEND 4 | | | | | | | |
| RUBBER VOLUME (VOL. %) | 35.9 | 61.7 | 36.6 | 36.6 | 21.1 | 23.2 | 23.7 |
| RUBBER/RESIN RATIO (VOL.) | 16/84 | 62/38 | 37/63 | 37/64 | 21/79 | 23/77 | 24/76 |
| RUBBER RESIN VISCOSITY RATIO | 1.1 | 1.1 | 1.1 | 0.4 | 1.1 | 0.5 | 0.5 |
| YOUNG'S MODULUS | 210 | 740 | 1020 | 1020 | 1350 | 1800 | 1700 |
| VOLUME SPECIFIC RESISTANCE (Ω cm) | 7.1E+06 | 1.2E+08 | 7.5E+09 | 8.5E+09 | 6.0E+11 | 8.9E+11 | 3.0E+12 |
| LOG VARIATIONS (R) | 0.2 | 0.3 | 0.3 | 0.8 | 0.4 | 0.6 | 0.9 |
| DIMENSION CHANGE (%) | 0.2 | NONE | NONE | NONE | NONE | NONE | NONE |
| SOLID PRINT DENSITY VARIATIONS | O | O | O | O | O | O | Δ |
| DURABILITY | BELT EXTENSION | O | O | O | O | O | O |

TABLE 8

| | CONTROL EXAMPLE 15 | EXAMPLE 18 | CONTROL EXAMPLE 17 | EXAMPLE 19 | EXAMPLE 20 | CONTROL EXAMPLE 16 | EXAMPLE 21 |
|---|---|---|---|---|---|---|---|
| AMORPHOUS NYLON 1 | 95 | 65 | 65 | | | | 65 |
| AMORPHOUS NYLON 2 | | | | | | | |
| PI | | | | | | | |
| PES | | | | | | | |
| PPS | | | | 68 | | | |
| PBT | | | | | 68 | | |
| PP | | | | | | 60 | |
| COMPATIBILIZING AGENT | 5 | 5 | 5 | 5 | 5 | 5 | 5 |
| RUBBER BLEND 1 | 5 | | | 32 | 32 | 40 | |
| RUBBER BLEND 2 | | 35 | | | | | |
| RUBBER BLEND 3 | | | 35 | | | | |
| RUBBER BLEND 4 | | | | | | | |
| RUBBER VOLUME (VOL. %) | 5.3 | 36.6 | 36.6 | 36.4 | 36.4 | 35.3 | 36.6 |
| RUBBER/RESIN RATIO (VOL.) | 5/95 | 37/63 | 37/63 | 36/64 | 36/64 | 35/65 | 37/63 |
| RUBBER RESIN VISCOSITY RATIO | 1.1 | 0.9 | 0.9 | 1.1 | 1 | 0.7 | 1.2 |
| YOUNG'S MODULUS | 2200 | 1000 | 1010 | 1900 | 860 | 220 | 1020 |
| VOLUME SPECIFIC RESISTANCE (Ω cm) | 3.5E+14 | 3.3E+10 | 4.2E+14 | 6.4E+09 | 6.7E+09 | 1.2E+10 | 7.5E+09 |
| LOG VARIATIONS (R) | 0.4 | 0.5 | 0.1 | 0.3 | 0.3 | 0.2 | 0.4 |
| DIMENSION CHANGE (%) | NONE | NONE | NONE | NONE | NONE | 3 | NONE |
| SOLID PRINT DENSITY VARIATIONS | – | O | – | O | O | O | Δ |
| DURABILITY | – | O | – | O | O | BELT EXTENSION | O |

TABLE 9

| | RUBBER BLEND 1 | RUBBER BLEND 2 | RUBBER BLEND 3 | RUBBER BLEND 4 | RUBBER BLEND 5 | RUBBER BLEND 6 | RUBBER BLEND 7 |
|---|---|---|---|---|---|---|---|
| EPDM | 100 | 100 | 100 | 0 | 100 | 100 | 100 |
| MODIFIED IIR | 0 | 0 | 0 | 100 | 0 | 0 | 0 |
| LIQUID RUBBER | 60 | 50 | 50 | 50 | 50 | 50 | 50 |
| ZINC OXIDE | 5 | 5 | 5 | 5 | 5 | 5 | 5 |
| STEARIC ACID | 1 | 1 | 1 | 1 | 1 | 1 | 1 |
| ANTIOXIDANT | 1.5 | 1.5 | 1.5 | 1.5 | 1.5 | 1.5 | 1.5 |
| KETJEN BLACK | 50 | 30 | 5 | 50 | 20 | 70 | 30 |
| GPF | 20 | 40 | 65 | 20 | 50 | 0 | 0 |
| FT | 0 | 0 | 0 | 0 | 0 | 0 | 40 |
| PHENOL BROMIDE | 12 | 12 | 12 | 0 | 12 | 12 | 12 |
| VOLUME RESISTIVITY LOGΩ·cm | 3.4 | 5.6 | 9.7 | 3.2 | 6.5 | 1.1 | 8.1 |

TABLE 10

| | | EXAMPLE 22 | EXAMPLE 23 | EXAMPLE 24 | CONTROL EXAMPLE 23 | EXAMPLE 25 |
|---|---|---|---|---|---|---|
| | APPLICATION IN EXAMPLE | CHARGING ROLL | CHARGING ROLL | CHARGING ROLL | CHARGING ROLL | CHARGING ROLL |
| SURFACE LAYER | FLUORINE FAMILY COAT | APPLIED | APPLIED | APPLIED | URATHANE FAMILY COAT | APPLIED |
| ELASTIC LAYER | PER 1 | 30 | 20 | 55 | 30 | 30 |
| | PER 2 | | | | | |
| | SEPS | | | | | |
| | PAE | | | | | |
| | COPE | | | | | |
| | PET | | | | | |
| | RUBBER BLEND 1 | 70 | 80 | 45 | 70 | 70 |
| | RUBBER BLEND 2 | | | | | |
| | RUBBER BLEND 3 | | | | | |
| | RUBBER BLEND 4 | | | | | |
| | RUBBER BLEND 5 | | | | | |
| | RUBBER BLEND 6 | | | | | |
| | RUBBER BLEND 7 | | | | | |
| | RUBBER VOLUME (%) | 65.6 | 78.6 | 40.1 | 65.6 | 65.6 |
| | RUBBER/RESIN RATIO (VOL) | 66/34 | 79/21 | 40/60 | 66/34 | 66/34 |
| | RUBBER RESIN VISCOSITY RATIO | 0.8 | 0.8 | 0.8 | 0.8 | 0.8 |
| | JIS HARDNESS | 33 | 31 | 45 | 33 | 33 |
| | VOLUME RESISTIVITY | 7.7 | 7.1 | 8.0 | 7.7 | 7.7 |
| | RESISTANCE VARIATIONS | 0.4 | 0.4 | 0.4 | 0.4 | 0.4 |
| FOAM LAYER | | CONDUCTIVE FOAM LAYER | CONDUCTIVE FOAM LAYER | CONDUCTIVE FOAM LAYER | CONDUCTIVE FOAM LAYER | CONDUCTIVE FOAM LAYER |
| ROLL CHARACTERISTICS | WATER CONTACT ANGLE | 95 | 95 | 95 | 75 | 95 |
| | ASKER C HARDNESS | 30 | 28 | 40 | 30 | 25 |
| | VOLUME RESISTIVITY | 7.9 | 7.2 | 8.2 | 7.8 | 8.0 |
| | RESISTANCE VARIATIONS | 0.6 | 0.6 | 0.4 | 0.6 | 0.5 |
| IMAGE QUALITY | FOGGING PROPERTY | O | O | O | O | — |
| | COLOR UNEVENESS | — | — | — | — | O |
| | TONER DIRT | O | O | O | X | O |

TABLE 11

| | | EXAMPLE 26 | EXAMPLE 27 | EXAMPLE 28 | EXAMPLE 29 | EXAMPLE 30 |
|---|---|---|---|---|---|---|
| | APPLICATION IN EXAMPLE | TRANSFER ROLL | TRANSFER ROLL | TRANSFER ROLL | TRANSFER ROLL | TRANSFER ROLL |
| SURFACE LAYER | FLUORINE FAMILY COAT | APPLIED | APPLIED | APPLIED | NOT APPLIED | NOT APPLIED |
| ELASTIC LAYER | PER 1 | 30 | 30 | | 30 | |
| | PER 2 | | | | | |
| | SEPS | | | 30 | | 30 |
| | PAE | | | | | |
| | COPE | | | | | |
| | PET | | | | | |
| | RUBBER BLEND 1 | | | 70 | | 70 |
| | RUBBER BLEND 2 | 70 | | | | |
| | RUBBER BLEND 3 | | | | | |
| | RUBBER BLEND 4 | | 70 | | 70 | |
| | RUBBER BLEND 5 | | | | | |
| | RUBBER BLEND 6 | | | | | |
| | RUBBER BLEND 7 | | | | | |
| | RUBBER VOLUME (%) | 65.6 | 65.6 | 70.9 | 65.6 | 70.9 |
| | RUBBER/RESIN RATIO (VOL) | 66/34 | 66/34 | 71/29 | 66/34 | 71/29 |
| | RUBBER RESIN VISCOSITY RATIO | 0.5 | 0.5 | 0.7 | 0.5 | 0.7 |
| | JIS HARDNESS | 33 | 33 | 38 | 38 | 38 |
| | VOLUME RESISTIVITY | 7.5 | 7.6 | 7.9 | 7.6 | 7.9 |
| | RESISTANCE VARIATIONS | 0.7 | 0.6 | 0.5 | 0.6 | 0.5 |
| FOAM LAYER | | CONDUCTIVE FOAM LAYER | CONDUCTIVE FOAM LAYER | CONDUCTIVE FOAM LAYER | CONDUCTIVE FOAM LAYER | CONDUCTIVE FOAM LAYER |
| ROLL CHARACTERISTICS | WATER CONTACT ANGLE | 95 | 95 | 95 | 95 | — |
| | ASKER C HARDNESS | 29 | 29 | 32 | 29 | 34 |
| | VOLUME RESISTIVITY | 7.6 | 8.1 | 8.5 | 8.1 | 8.2 |
| | RESISTANCE VARIATIONS | 0.8 | 0.7 | 0.6 | 0.7 | 0.6 |
| IMAGE QUALITY | FOGGING PROPERTY | — | — | — | — | — |
| | COLOR UNEVENESS | O | O | O | O | O |
| | TONER DIRT | O | O | O | — | — |

TABLE 12

| | | CONTROL EXAMPLE 18 | CONTROL EXAMPLE 19 | CONTROL EXAMPLE 20 | CONTROL EXAMPLE 21 | CONTROL EXAMPLE 22 |
|---|---|---|---|---|---|---|
| | APPLICATION IN EXAMPLE | CHARGING ROLL | CHARGING ROLL | CHARGING ROLL | CHARGING ROLL | TRANSFER ROLL |
| SURFACE LAYER | FLUORINE FAMILY COAT | NOT APPLIED | APPLIED | APPLIED | APPLIED | NOT APPLIED |
| ELASTIC LAYER | PER 1 | 6 | 95 | | | |
| | PER 2 | | | | | 30 |
| | SEPS | | | | | |
| | PAE | | | | | |
| | COPE | | | | | |
| | PET | | | 35 | | |
| | RUBBER BLEND 1 | 95 | 5 | 65 | | 70 |
| | RUBBER BLEND 2 | | | | | |
| | RUBBER BLEND 3 | | | | 100 | |
| | RUBBER BLEND 4 | | | | | |
| | RUBBER BLEND 5 | | | | | |
| | RUBBER BLEND 6 | | | | | |
| | RUBBER BLEND 7 | | | | | |
| | RUBBER VOLUME (%) | 94.0 (X) | 4.1 | 69.3 | 100.0 | 65.6 |
| | RUBBER/RESIN RATIO (VOL) | 94/6 | 4/96 | 69/31 | 100/0 | 66/34 |
| | RUBBER RESIN VISCOSITY RATIO | 0.8 | 0.8 | 0.7 | — | 0.4 (X) |
| | JIS HARDNESS | KNEADING IMPOSSIBLE | 55 | 85 (X) | 30 | 42 |
| | VOLUME RESISTIVITY | — | 13.8 (X) | 7.9 | 9.7 | 7.9 |
| | RESISTANCE VARIATIONS | — | 0.4 | 0.4 | 1.7 (X) | 1.4 (X) |
| FOAM LAYER | | — | CONDUCTIVE FOAM LAYER | CONDUCTIVE FOAM LAYER | CONDUCTIVE FOAM LAYER | CONDUCTIVE FOAM LAYER |
| ROLL CHARACTERISTICS | WATER CONTACT ANGLE | — | 95 | 95 | 95 | 95 |
| | ASKER C HARDNESS | — | 40 | 75 | 28 | 38 |
| | VOLUME RESISTIVITY | — | 14 | 8.2 | 10.1 | 8.0 |
| | RESISTANCE VARIATIONS | — | 0.5 | 0.5 | 1.6 (X) | 1.28 (X) |
| IMAGE QUALITY | FOGGING PROPERTY | — | X | X | — | — |
| | COLOR UNEVENESS | — | — | — | X | X |
| | TONER DIRT | — | O | O | O | O |

TABLE 13

| | | EXAMPLE 31 | CONTROL EXAMPLE 24 | EXAMPLE 32 | EXAMPLE 33 | EXAMPLE 34 | CONTROL EXAMPLE 25 |
|---|---|---|---|---|---|---|---|
| | APPLICATION IN EXAMPLE | CHARGING ROLL | CHARGING ROLL | CHARGING ROLL | TRANSFER ROLL | CHARGING ROLL | CHARGING ROLL |
| SURFACE LAYER | FLUORINE FAMILY COAT | APPLIED | APPLIED | APPLIED | APPLIED | APPLIED | APPLIED |
| ELASTIC LAYER | PER 1 | | 50 | 22 | 88 | 30 | 50 |
| | PER 2 | | | | | | |
| | SEPS | | | | | | |
| | PAE | | | | | | |
| | COPE | 30 | | | | | |
| | PET | | | | | | |
| | RUBBER BLEND 1 | 70 | | 78 | 12 | | |
| | RUBBER BLEND 2 | | | | | | |
| | RUBBER BLEND 3 | | | | | | |
| | RUBBER BLEND 4 | | | | | | |
| | RUBBER BLEND 5 | | 50 | | | | |
| | RUBBER BLEND 6 | | | | | 70 | |
| | RUBBER BLEND 7 | | | | | | 50 |
| | RUBBER VOLUME (%) | 65.6 | 46.0 | 74.4 | 10.0 | 65.6 | 45.0 |
| | RUBBER/RESIN RATIO (VOL) | 66/34 | 45/55 | 74/26 | 10/90 | 66/34 | 45/55 |
| | RUBBER RESIN VISCOSITY RATIO | 1.1 | 1.0 | 0.8 | 0.8 | 1.4 | 1.1 |
| | JIS HARDNESS | 68 | 42 | 26 | 50 | 69 | 41 |
| | VOLUME RESISTIVITY | 7.5 | 13.1 (X) | 6.2 | 11.9 | 5.9 | 13.3 (X) |
| | RESISTANCE VARIATIONS | 0.3 | 0.1 | | 0.4 | 0.8 | 0.1 |
| FOAM LAYER | | CONDUCTIVE FOAM LAYER | CONDUCTIVE FOAM LAYER | CONDUCTIVE FOAM LAYER | CONDUCTIVE FOAM LAYER | CONDUCTIVE FOAM LAYER | CONDUCTIVE FOAM LAYER |
| ROLL CHARACTERISTICS | WATER CONTACT ANGLE | 95 | 95 | 95 | 95 | 95 | 95 |
| | ASKER C HARDNESS | 66 | 40 | 29 | 48 | 65 | 39 |
| | VOLUME RESISTIVITY | 7.7 | 13.5 (X) | 6.4 | 12.0 | 6.1 | 13.4 (X) |
| | RESISTANCE VARIATIONS | 0.5 | 0.1 | 0.6 | 0.5 | 0.9 | 0.2 |
| IMAGE QUALITY | FOGGING PROPERTY | O | X | O | — | O | X |
| | COLOR UNEVENESS | — | — | — | O | — | — |
| | TONER DIRT | O | O | O | O | O | O |

TABLE 14

| | CONTROL EXAMPLE 26 | EXAMPLE 35 | EXAMPLE 36 | EXAMPLE 37 | EXAMPLE 38 | CONTROL EXAMPLE 27 |
|---|---|---|---|---|---|---|
| PER 1 | 5 | 30 | 30 | | 55 | 95 |
| PER 2 | | | | 30 | | |
| SEPS | | | | | | |
| PAE | | | | | | |
| COPE | | | | | | |
| PET | | | | | | |
| RUBBER BLEND 1 | 95 | 70 | 70 | 70 | 45 | 5 |
| RUBBER BLEND 2 | | | | | | |
| RUBBER BLEND 3 | | | | | | |
| RUBBER BLEND 4 | | | | | | |
| SURFACE URETHANE PAINT | APPLIED | APPLIED | NOT APPLIED | APPLIED | APPLIED | APPLIED |
| RUBBER VOLUME (%) | 94.0 | | | | | 4.1 |
| RUBBER/RESIN RATIO (VOL) | 94/6 | | | | | 4/96 |
| RUBBER/RESIN VISCOSITY RATIO | 0.8 | 0.8 | 0.8 | 0.4 | 0.8 | 0.8 |
| JIS A HARDNESS | KNEADING IMPOSSIBLE | 33 | 34 | 42 | 45 | 55 |
| VOLUME SPECIFIC RESISTANCE (Ω cm) | — | 5.1E+07 | 9.1E+07 | 9.1E+07 | 1.1E+07 | 7.0E+13 |
| LOG VARIATIONS (R) | — | 0.3 | 0.3 | 0.8 | 0.4 | 0.4 |
| FOGGING PROPERTY | — | ○ | ○ | ○ | ○ | × |
| PRINT DENSITY VARIATIONS | — | ○ | ○ | △ | ○ | ○ |

TABLE 15

| | EXAMPLE 39 | EXAMPLE 40 | EXAMPLE 41 | EXAMPLE 42 | CONTROL EXAMPLE 28 | CONTROL EXAMPLE 29 |
|---|---|---|---|---|---|---|
| PER 1 | 30 | 30 | | | | |
| PER 2 | | | | | | |
| SEPS | | | 30 | | | |
| PAE | | | | 30 | | |
| COPE | | | | | | |
| PET | | | | | 35 | |
| RUBBER BLEND 1 | | | 70 | 70 | 65 | |
| RUBBER BLEND 2 | 70 | | | | | |
| RUBBER BLEND 3 | | | | | | 100 |
| RUBBER BLEND 4 | | 70 | | | | |
| SURFACE URETHANE PAINT | APPLIED | APPLIED | APPLIED | APPLIED | APPLIED | APPLIED |
| RUBBER VOLUME (%) | 65.6 | 65.6 | 68.0 | 70.9 | 69.3 | 100.0 |
| RUBBER/RESIN RATIO (VOL) | 66/34 | 66/34 | 68/32 | 71/29 | 69/31 | 100/0 |
| RUBBER/RESIN VISCOSITY RATIO | 0.5 | 0.5 | 0.6 | 0.7 | 0.7 | — |
| JIS A HARDNESS | 33 | 33 | 30 | 38 | 85 | 30 |
| VOLUME SPECIFIC RESISTANCE (Ω cm) | 3.3E+07 | 4.1E+07 | 5.5E+07 | 8.8E+07 | 9.0E+07 | 6.1E+09 |
| LOG VARIATIONS (R) | 0.5 | 0.5 | 0.5 | 0.5 | 0.4 | 1.7 |
| FOGGING PROPERTY | O | O | O | O | X | O |
| PRINT DENSITY VARIATIONS | O | O | O | O | O | Δ |

SEMICONDUCTIVE MEMBER, SEMICONDUCTIVE BELT, SEMICONDUCTIVE ROLL, AND IMAGE FORMATION APPARATUS

BACKGROUND OF THE INVENTION

[Technical Field Pertinent to the Invention]

This invention relates to an image formation apparatus using electrophotography such as a copier and a printer and semiconductive members such as a semiconductive belt and a semiconductive roll used appropriate with the image formation apparatus and in particular to a charging roll for uniformly charging the surface of an image support in a copier, a printer, etc., a transfer roll for transferring a toner image formed on the image support to a record medium, a transfer toll for once transferring a toner image formed on the image support to an intermediate transfer body, a transfer roll for transferring the toner image once transferred to the intermediate transfer body to a record medium such as paper, a semiconductive roll used with a cleaning roll, etc., for removing the toner image on the image support, a semiconductive belt used as a paper transport body for transporting the intermediate transfer body and paper, and an image formation apparatus comprising at least one of the semiconductive members.

[Related arts]

An image formation apparatus using electrophotography forms uniform charges on an image support made of a photoconductive photosensitive body made of an inorganic or organic material and forms an electrostatic latent image with laser light, etc., modulated based on an image signal, then develops the electrostatic latent image in charged toner to form a visible toner image. The image formation apparatus electrostatically transfers the toner image via an intermediate transfer body or directly to a transfer body of paper, etc., thereby providing any desired reproduced image.

Particularly, as an image formation apparatus adopting the system of primarily transferring the toner image formed on the image support to the intermediate transfer body and further secondarily transferring the toner image on the intermediate transfer body to paper, an apparatus disclosed in JP-A-62-206567, etc., is known.

It is proposed to use a semiconductive endless belt comprising carbon black loaded to thermoplastic resin of polycarbonate resin (JP-A-3-89357, JP-A-06-095521), PVDF (polyvinylidene fluoride) (JP-A-5-200904, JP-A-6-228335), polyalkylene phthalate (JP-A-6-149081), PC (polycarbonate)/PAT (polyalkylene terephthalate) blend material (U.S. Pat. No. 2,845,059), ETFE (ethylene tetrafluoroethylene copolymer)/PC, ETFE/PAT, PC/PAT blend material (JP-A-6-149079), etc., as material of the intermediate transfer body used with the image formation apparatus adopting the intermediate transfer body system.

However, it is very difficult to control the resistance value of a resin material in a semiconductive region and it is almost impossible to stably provide any desired resistance value with normal conductive carbon black loaded to a normal resin material. Thus, the resistance values of all semiconductive endless belts need to be measured for selection and therefore costs are increased.

As described in "Koubunshikakou, vol.43, Nov. 4, 1977, SUMITA et al.," as carbon black is loaded into a high polymer of resin material, etc., conductivity is small while a small amount of carbon black is loaded. From one threshold value, carbon black forms a conductor circuit and conductivity is enhanced rapidly and a medium resistance value cannot be provided.

Further, as a belt material used with the image formation apparatus adopting the intermediate transfer body system, JP-A-9-305038 and JP-A-10-240020 propose an elastic belt containing a reinforcing material comprising woven cloth of ester, etc., and elastic member laminated on each other.

However, the elastic belt involves a problem of occurrence of age extension caused by belt tension at the driving time.

JP-A-10-264268 discloses an attempt to decrease age extension of a belt at the driving time by heating resin or rubber reinforced with fibers in an expansion state for decreasing variations in inner peripheral length and providing a belt excellent in dimension stability.

However, this method has the disadvantage that it takes much time and labor as a manufacturing method, increasing the manufacturing costs.

Thus, although a large number of attempts have been made, variations in resistance values in members are large and it is difficult to stably provide members having uniform resistance values and decrease age extension at the belt driving time at low costs.

If in-plane variations in volume resistivity of intermediate transfer body (ΔR) are large, particularly in a color image, a partial color loss is caused by a partial transfer efficiency difference and uniform high image quality cannot be provided; this is a problem.

The volume resistivity of an intermediate transfer body must be controlled in a predetermined range to provide high transfer image quality, in-plane variations in the intermediate transfer body (resistance value difference between the maximum and minimum values) must be small, and if the operating environmental condition changes, the volume resistivity must not largely change and high quality must be provided stably. For example, in practical use, it is required that volume resistivity change in a low-temperature and low-humidity environment of 10° C. and 15%RH and a high-temperature and high-humidity environment of 28° C. and 85%RH be within 1.5 orders of magnitude (logΩ cm).

To give conductivity to material forming an intermediate transfer body, a method of giving a conductive agent giving electronic conductivity into composition material and a method of giving a conductive agent giving ion conductivity are available.

With a resin material comprising carbon black of a conductive agent giving electronic conductivity dispersed solely, the volume resistivity responsive to environmental change of temperature and humidity less varies, but it is difficult to uniformly disperse carbon black and thus in-plane variations in volume resistivity become easily large; this is a problem.

To give a conductive agent giving ion conductivity, volume resistivity change in the plane of the intermediate transfer body is extremely small, namely, 0.6 orders of magnitude (logΩ cm) or less. In contrast, the volume resistivity responsive to environmental change of temperature and humidity varies largely. For example, the resistance value difference between the high-temperature and high-humidity environment of 28° C. and 85%RH (H/H environment) and the low-temperature and low-humidity environment of 10° C. and 15%RH (L/L environment) is 1.5 to tour orders of magnitude (logΩ cm); this is a problem.

In an electrophotographic image formation apparatus, a semiconductive roll is often adopted. As the semiconductive roll, the following roll is often used: A conductive substance of carbon black, metal oxide, organic or inorganic electrolyte, etc., is dispersed in general elastomer (elastic body) such as EPDM (ethylene propylene diene rubber), NBR (nitrile butadiene rubber), SBR (styrene butadience rubber), polyurethane rubber, silicone rubber, or Norsorex to give conductivity, and the outer periphery of a conductive metal core is coated with a conductive foam elastic body foamed by machine foaming in air, nitrogen or with a chemical foaming agent to form a roll.

To control the electrical characteristic of a semiconductive roll, a method of changing the conductive agent blend amount in a conductive foam is known, but it is difficult to balance resistance because the hardness and resistance of the conductive foam is contrary to each other. With a semiconductive roll having electronic conductivity, control in a medium resistance region of $10^6$ to $10^{12}$ Ω cm is hard to perform, and resistance variations in semiconductive roll or between rolls are large; this is a problem.

It is very difficult to control the resistance value of a resin material in a semiconductive region; as with the above-mentioned semiconductive endless belt, it is almost impossible to provide any desired resistance value with normal conductive carbon black loaded to a normal resin material.

To resolve this problem, JP-A-10-254515 proposes a semiconductive roll comprising two types of carbon black different in characteristic dispersed in a foam elastic body having a sea island structure of three types of rubber materials different in solubility parameter value.

JP-A-11-22719 proposes a charging roll comprising a thermoplastic elastomer layer having volume specific resistance of $10^6$ to $10^9$ Ω cm and a resin material layer of $10^{10}$ Ω cm or less.

JP-A-11-45013 discloses that carbon black of a particular specific surface area is loaded to a rubber mixture of EPDM and NBR to provide an OA machine member whose resistance value is controlled.

However, also in a large number of these attempts, resistance value variations in roll member are large and it is difficult to stable provide members having a uniform resistance value.

A semiconductive roll of ion conductivity type wherein an antistatic additive of fourth-grade ammonium salt, etc., and inorganic and organic electrolytes of alkaline metal, etc., are loaded has extremely small in-roll resistance variations and is desirable, but involves a problem of large resistance value change responsive to environmental change of temperature, humidity, etc.

If in-plane volume resistivity variations of semiconductive roll (ΔR) are large, for example, to use the semiconductive roll as a charging roll, an image support is charged unevenly and in a transfer roll, particularly in a color image, a partial color loss, etc., is caused by a partial transfer efficiency difference and uniform high image quality cannot be provided; this is a problem.

Further, in the related art, to use semiconductive rolls of conductive foam elastic bodies as a charging roll and a transfer roll, the volume resistivity partially changes because of deposition of toner, etc.; this is a problem.

JP-A-6-149097 proposes a roller (bias roller) characterized in that the roller surface of a silicon foam rubber body is coated partially with a fluorine resin or a silicone resin like fine spots. JP-A-6-175470 proposes a conductive roller provided by forming the roller surface of a urethane foam rubber body of a soluble fluorine resin with a conductive material blended.

However, asperities of foam cells occur on the surface of every foam rubber member. Thus, if the surface layer is coated with a fluorine-family resin, the scrape effect of a cleaning blade cannot sufficiently be exerted and there is a problem of occurrence of toner dirt.

SUMMARY OF THE INVENTION

[Problem to be Solved by the Invention]

It is therefore an object of the invention to provide semiconductive members such as a semiconductive belt and a semiconductive roll improved in uniformity of electric resistance with less change in electric resistance depending on the environment, and an image formation apparatus using such semiconductive members to provide high-quality images stably.

[Means for Solving the Problem]

To the end, according to the invention, there is provided a semiconductive member having a portion formed of a thermoplastic elastomer composition comprising a thermoplastic resin as a matrix and rubber particles at least some of which have conductivity and at least some of which are cross-linked as domain.

In the semiconductive member of the invention, preferably the ratio between viscosity of the thermoplastic resin, $\eta_m$, and viscosity of a rubber component forming the rubber particles when the rubber component is not cross-linked or is being cross-linked, $\eta_r$, is $$0.5<\eta_r/\eta_m<1.5$$

Preferably, the thermoplastic resin is made of at least one resin selected from the group consisting of polyamide family resin, polyester family resin, polyimide family resin, polysulfide family resin, polysulfone family resin, styrene family resin, olefin family resin, and urethane family resin. Preferably, the rubber particles contain ketjen black and carbon black with an oil absorption amount of 0.5 cc/g or more.

The first semiconductive belt of semiconductive belts of the invention provided to the end is a semiconductive belt having a base material and a surface layer, wherein the base material is formed of a thermoplastic elastomer composition comprising an insulating thermoplastic resin as a matrix and rubber particles at least some of which have conductivity and at least some of which are cross-linked as domain, the semiconductive belt having a Young's modulus of 500 MPa or more and volume resistivity of $10^7$ to $10^{13}$ Ω cm.

The second semiconductive belt of semiconductive belts of the invention has a thermoplastic elastomer member formed of a thermoplastic elastomer composition having a thermoplastic resin as a matrix and rubber particles at least some of which are cross-linked as domain and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ Ω cm, and variations in volume specific resistance value (R) being within to the power of one.

In the first and second semiconductive belts of the invention, preferably the thermoplastic resin has a Young's modulus of 1000 MPa or more, the rubber particle has volume resistivity of $10^7$ Ω cm or less, and the thermoplastic elastomer composition has a volume fraction of thermoplastic resin/rubber particles =30/70 to 90/10 between the thermoplastic resin and the rubber particles.

In the first and second semiconductive belts of the invention, preferably the ratio between viscosity of the thermoplastic resin, $\eta_m$, and viscosity of a rubber component forming the rubber particles when the rubber component is not cross-linked or is being cross-linked, $\theta_r$, is $$0.5<\eta_r/\eta_m<1.5$$

The thermoplastic resin may be made of at least one resin selected from the group consisting of polyamide family resin, polyester family resin, polyimide family resin, polysulfide family resin, and polysulfone family resin. Preferably, the rubber particles contain ketjen black and carbon black with an oil absorption amount of 0.5 cc/g or more.

Further, in the first semiconductive belt of the semiconductive belts of the invention, preferably the surface layer is a low surface energy layer made of a material having lower surface energy than the base material, in which case preferably the surface layer is made of a material consisting essentially of fluorine family resin or a material comprising fluorine family resin powder dispersed.

Further, preferably the first and second semiconductive belts of the invention are molded by cylindrical molding.

The first semiconductive roll of semiconductive rolls of the invention provided to the end comprises a core, a foam surrounding the core, and an elastic layer formed of a thermoplastic elastomer composition comprising an insulating thermoplastic resin as a matrix and rubber particles at least some of which have conductivity and at least some of which are cross-linked as domain, surrounding the foam, and has ASKER C hardness of 25 to 70 degrees and volume resistivity of $10^4$ to $10^{12}$ Ω cm.

The second semiconductive roll of semiconductive rolls of the invention is a roll comprising a thermoplastic elastomer member formed like a cylinder on the outer periphery of a core with the thermoplastic elastomer member being formed of a thermoplastic elastomer composition having a thermoplastic resin as a matrix and rubber particles at least some of which are cross-linked as domains and comprising the rubber particles at least some of which have conductivity with the volume specific resistance value of the rubber particle being smaller than that of the thermoplastic resin, JIS A hardness being 25 to 50 degrees, the volume specific resistance value being $10^6$ to $10^{12}$ Ω cm, and variations in volume specific resistance value (R) being within to the power of one.

In the first semiconductive roll of the semiconductive rolls of the invention, preferably the thermoplastic resin has a tensile elastic modulus of 50 MPa or less, the rubber particle has volume resistivity of $10^8$ Ω cm or less, and the thermoplastic elastomer composition has a volume fraction of thermoplastic resin/rubber particles =25/75 to 90/10 between the thermoplastic resin and the rubber particles.

In the second semiconductive roll of the semiconductive rolls of the invention, preferably the 100% tensile elastic modulus of the matrix is 50 MPa or less, the volume specific resistance value of the domain is $10^6$ Ω cm or less, and the volume fraction of the domain to the matrix is 10/90 to 90/10.

In the first and second semiconductive rolls of the invention, preferably the ratio between viscosity of the thermoplastic resin, $\eta_m$, and viscosity of a rubber component forming the rubber particles when the rubber component is not cross-linked or is being cross-linked, $\eta_r$, is $$0.5<\eta_r/\eta_m<1.5$$

The thermoplastic resin may be made of at least one resin selected from the group consisting of styrene family resin, olefin family resin, urethane family resin, polyamide family resin, and polyester family resin.

Preferably, the rubber particles contain black and carbon black with an oil absorption amount of 0.5 cc/g or more.

Further, preferably the first semiconductive roll of the semiconductive rolls of the invention comprises a low surface energy layer made of a material having lower surface energy than the elastic layer on the elastic layer, in which case preferably the low surface energy layer is made of a material consisting essentially of fluorine family resin or a material comprising fluorine family resin powder dispersed.

The first image formation apparatus of image formation apparatus of the invention provided to the end is an image formation apparatus for charging a predetermined photosensitive body, applying exposure light responsive to an image to the photosensitive body, thereby forming an electrostatic latent image on the photosensitive body, developing the electrostatic latent image in toner, thereby forming a toner image on the photosensitive body, and finally transferring the toner image onto a predetermined record medium and fixing the toner image, thereby forming an image made of the fixed toner image on the record medium, characterized in that the image formation apparatus comprises a semiconductive belt having a base material being formed of a thermoplastic elastomer composition comprising an insulating thermoplastic resin as a matrix and rubber particles at least some of which have conductivity and at least some of which are cross-linked as domains and a surface layer formed on a surface of the base material, the semiconductive belt having a Young's modulus of 500 MPa or more and volume resistivity of $10^7$ to $10^{13}$ Ω cm.

In the first image formation apparatus of the invention, the semiconductive belt may be an intermediate transfer belt for receiving transfer of the toner image from the photosensitive body and transporting the transferred toner image for transfer to the record medium or may be a paper transport belt for supporting the record medium and transporting the record medium via a position in contact with or in the proximity of the photosensitive body to receive transfer of the toner image from the photosensitive body on the record medium.

The second image formation apparatus of image formation apparatus of the invention is an image formation apparatus comprising an image support for forming an electrostatic latent image responsive to image information, a developing unit for visualizing the electrostatic latent image formed on the image support as a toner image in toner, an intermediate transfer body onto which the toner image supported on the image support is transferred, and a transfer unit for transferring the toner image transferred onto the intermediate transfer body to a record medium, characterized in that a material forming the intermediate transfer body has a thermoplastic elastomer member formed of a thermoplastic elastomer composition having a thermoplastic resin as a matrix and rubber particles at least some of which are cross-linked as domain and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ Ω cm, and variations in volume specific resistance value (R) being within to the power of one.

The third image formation apparatus of image formation apparatus of the invention is an image formation apparatus comprising an image support for forming an electrostatic latent image responsive to image information, a developing unit for visualizing the electrostatic latent image formed on the image support as a toner image in toner, a transfer material transport unit having a conductive belt for transporting a transfer material to the image support to transfer the toner image supported on the image support to the transfer material, and a transfer unit for transferring the toner image on the image support to the transfer material, characterized in that the conductive belt has a thermoplastic elastomer member formed of a thermoplastic elastomer composition having a thermoplastic resin as a matrix and rubber particles at least some of which are cross-linked as domain and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ Ω cm, and variations in volume specific resistance value (R) being within to the power of one.

The fourth image formation apparatus of image formation apparatus of the invention provided to the end is an image formation apparatus for charging a predetermined photosensitive body, applying exposure light responsive to an image to the photosensitive body, thereby forming an electrostatic latent image on the photosensitive body, developing the electrostatic latent image in toner, thereby forming a toner image on the photosensitive body, and finally transferring the toner image onto a predetermined record medium and fixing the toner image, thereby forming an image made of the fixed toner image on the record medium, characterized in that the image formation apparatus comprises a semiconductive roll comprising a core, a foam surrounding the core, and an elastic layer formed of a thermoplastic elastomer composition comprising an insulating thermoplastic resin as a matrix and rubber particles at least some of which have conductivity and at least some of which are cross-linked as domain, surrounding the foam, and having ASKER C hardness of 25 to 70 degrees and volume resistivity of $10^4$ to $10^{12}$ Ω cm.

Further, the fifth image formation apparatus of image formation apparatus of the invention is an image formation apparatus for charging a predetermined photosensitive body, applying exposure light responsive to an image to the photosensitive body, thereby forming an electrostatic latent image on the photosensitive body, developing the electrostatic latent image in toner, thereby forming a toner image on the photosensitive body, and finally transferring the toner image onto a predetermined record medium and fixing the toner image, thereby forming an image made of the fixed toner image on the record medium, characterized in that a semiconductive roll comprising a thermoplastic elastomer member formed like a cylinder on the outer periphery of a core with the thermoplastic elastomer member being formed of a thermoplastic elastomer composition having a thermoplastic resin as a matrix and rubber particles at least some of which are cross-linked as domains and comprising the rubber particles at least some of which have conductivity with the volume specific resistance value of the rubber particle being smaller than that of the thermoplastic resin, JIS A hardness being 25 to 50 degrees, the volume specific resistance value being $10^4$ to $10^{12}$ Ω cm, and variations in volume specific resistance value (R) being within to the power of one is used.

In the fourth and fifth image formation apparatus of the invention, the semiconductive roll may be a charging roll for charging the photosensitive body or may be a transfer roll for transferring from a toner image support supporting the toner image before transfer to a toner image support for supporting the toner image after transfer.

Tables 1–15 show test search are depict examples.

DETAILED DESCRIPTION OF THE PREFERRED EMBODIMENTS

[Mode for Carrying out the Invention]

Embodiments of the invention will be discussed.

In thermoplastic elastomer compositions forming semiconductive members of the invention, namely, thermoplastic elastomer compositions forming thermoplastic elastomer meters of the base material of a first semiconductive belt of the invention, a second semiconductive belt of the invention, an elastic layer of a first semiconductive roll of the invention, and a second semiconductive roll of the invention, cross-link rubber particles having conductivity and as required, rubber particles having no conductivity are finely dispersed stably in a matrix of thermoplastic resin. Conductivity giving agent exists in the cross-link rubber particles having conductivity. The conductivity of the thermoplastic elastomer after being molded can be placed in a semiconduction region in any desired range and particularly in-plane variations of resistance (ΔR) can be placed within an order of magnitude (logΩ cm) by controlling at least one of the volume resistivity of the rubber particles containing the conductivity giving agent in the composition, the amounts, particle diameters, and structures of the rubber particles, and the conductivity (volume resistivity) of the matrix or by controlling them in combination.

Figure 1:
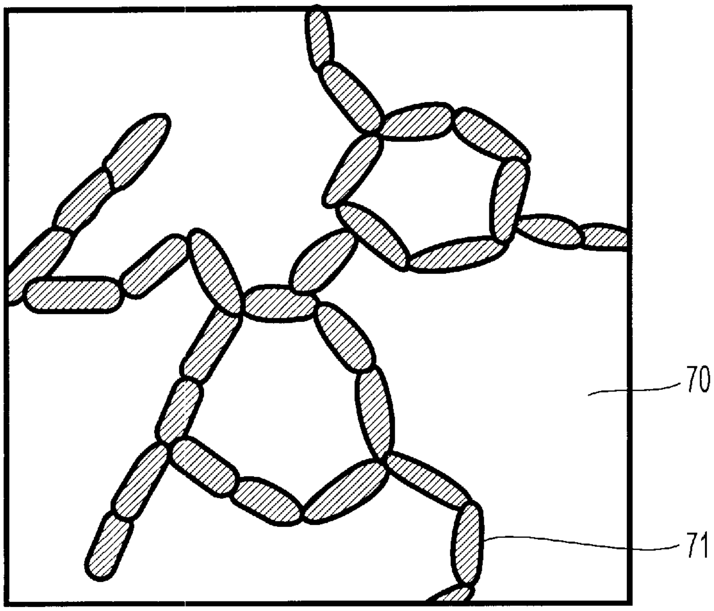
FIG. 1 is a conceptual drawing to show formation of conduction paths as carbon black is dispersed in a polymer.

The reason why variations in volume resistivity of thermoplastic elastomer compositions used as the base materials of the invention are small and stable is as follows:

As described in the document by SUMITA et al. mentioned above, for example, if carbon black is loaded directly into a polymer, as shown in FIG. 1, as carbon black 71 is loaded into a polymer 70, it forms a conductive circuit in a certain addition amount of the black carbon and conductivity is enhanced rapidly and thus it is very difficult to control the volume resistivity in the semiconduction region.

Figure 2:
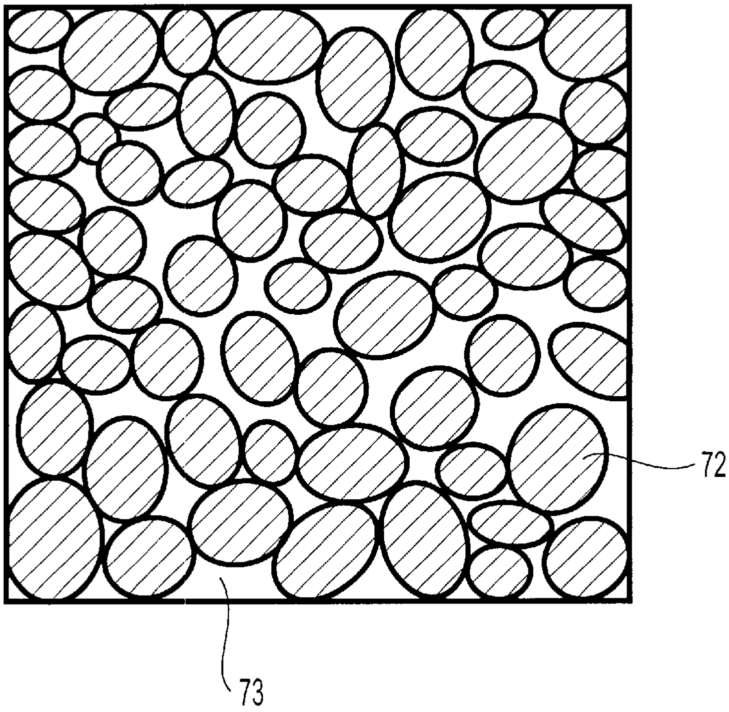
FIG. 2 is a conceptual drawing to show formation of conduction paths because of conductive rubber phase in the invention.

However, with the thermoplastic resin elastomer composition used with the invention, as shown in FIG. 2, rubber 72 in which an amount of carbon black only showing conductivity is previously contained is prepared, the rubber and a thermoplastic resin 73 are kneaded, the rubber is cross-linked during the kneading, and conductive rubber phase is dispersed and fixed in the thermoplastic resin, whereby the rubber particles cannot form any conductive circuit and electrons are jumped between rubber particles having conductivity (called tunnel effect), thereby producing conductivity. At this time, the volume resistivity is determined by the distance between the rubber particles. Therefore, the volume resistivity of the thermoplastic elastomer composition in the, invention can be controlled as desired based on the amount of the rubber component in the resin composition and the rubber particle diameters and the rubber particle diameters become almost uniform, so that material having extremely small conductivity variations can be provided.

The conductivity giving agent used with the invention contributes to conductivity more effectively if it exists on the interface between the rubber particles and the matrix or in the vicinity of the interface rather than in the rubber particles. To increase the concentration of the conductivity giving agent in the vicinity of the interface, a method of dispersing rubber particles of the structure consisting of a core and an external layer consisting of two types of rubber having large and small polarities in a matrix can be adopted. The conductivity giving agent is taken in the rubber having a high polarity more than in the rubber having a low polarity. Thus, the structure of the rubber particle is made a two-layer structure wherein the inner core is made of the rubber having the lower polarity and the outer layer is made of the rubber having the higher polarity, whereby the conductivity giving agent can be made to exist on the interface between the rubber particles and the matrix or in the vicinity of the interface. To make the structure, the product of the volume fraction ratio between the rubber having the low polarity (1) and the rubber having the high polarity (2) ($\phi_1/\phi_2$) and the viscosity ratio therebetween at the kneading time ($\eta_2/\eta_1$) may satisfy the following expression:

$$(\phi_1/\phi_2)\times(\eta_2/\eta_1)<1$$

The conductivity of the thermoplastic elastomer composition can be controlled by changing the type and amount of conductivity giving agent contained in the dispersed rubber particles; rather, a method of providing a rubber composition having conductivity and a rubber composition having no conductivity and changing the ratio in each of the compositions, thereby controlling electric resistance is easy and is also preferred from the viewpoint of uniformity of dispersing the conductivity giving agent in the rubber.

Further, the rubber particle diameters can be controlled by selecting compatibility between resin and rubber, kneading temperature, and shearing speed at the manufacturing time of the thermoplastic elastomer composition called in the invention described later.

The conductivity of the thermoplastic elastomer composition of the invention can be controlled by selecting the type of thermoplastic resin (matrix) contained in the thermoplastic elastomer composition.

At least some of the rubber particles used as domains dispersed in the resin composition in the invention mentioned above are cross-linked.

Various types of rubber can be used as rubber components forming the rubber particles. For example, diene-family rubber and its hydrates (for example, NR, IR, NBR hydride, SBR hydride), olefin-family rubber (for example, ethylene propylene (EODM, EPM), modified ethylene propylene maleate (M-EPM), IIR, isobutylene and aromatic vinyl or diene-family monomer copolymer, acrylic rubber (ACN) ionomer, halogen-containing rubber (for example, Br-IIR, CI-IIR, isobutylene paramethyl styrene copolymer bromide (BIMS), CR, hydrin rubber (CHR), chlorosulfonated polyethylene (CSN), chlorinated polyethylene (CM), modulated chlorinated polyethylene maleate (M-CM), silicone rubber (for example, methyl vinyl silicone rubber, methyl phenyl silicone rubber), ion-containing rubber (for example, polysulfide rubber), fluororubber (for example, vinylidene polysulfide family rubber, fluorine-containing vinyl ether family rubber, fluorine-containing phosphazene family rubber), and thermoplastic elastomer (for example, styrene family elastomer, olefin family elastomer, ester family elastomer, urethane family elastomer, polyamide family elastomer) can be named.

Particularly, as a preferred structure of a rubber particle, the rubber particle is of a two-layer structure and a conductivity giving agent is concentrated on the outer layer. For this purpose, to make the polarity of the outer layer of the rubber particle higher than the polarity of the inner layer, specifically, comparatively high polarity rubber of CR, NBR, hydrin rubber, chlorosulfonated polyethylene, urethane rubber, fluororubber, polysulfide rubber, etc., may be used as the outer layer of the rubber particle and non-polar rubber of IIR, EPR, silicone rubber, NR, SBR, BR, IR, etc., may be used as the inner layer.

As the conductivity giving agent used in the invention, known conductivity giving agents can be used; a metal family filler and a carbon family filler can be named as preferred examples. As the metal family filler, metal powder of Ag powder, Ni powder, Cu powder, Ag-plated Cu powder, etc., metal fiber of Al fiber, Cu fiber, stainless fiber, etc., metal flake, etc., can be named. As the carbon family filler, carbon black of furnace black, acetylene black, thermal black, etc., black lead, carbon fiber, etc., can be named. Carbon black may be solely loaded to the resin composition of the base material of the invention. Preferably, the amounts of the conductivity giving agent and rubber are 5/95 to 90/10 in terms of volume ratio.

It is desirable to use as the carbon black used in the invention, both ketjen black used as most general conductive carbon black and carbon black of a high structure with an oil absorption amount of 0.5 cc/g or more.

The ketjen black is very bulky and is hard to be contained in rubber in a large amount. Therefore, carbon black of a high structure forms a conduction circuit between the ketjen black particles, whereby the rubber component shows stable conductivity with a comparatively small amount of the carbon black.

It is desirable that the ratio between the ketjen black and the carbon black with an oil absorption amount of 0.5 cc/g or more is in the range of 20/80 to 90/10.

As the ketjen black, ketjen black EC, ketjen black EC-600, and ketjen black EC-600JD of Lion Aiczo Co., Ltd. can be named, and general SAF, HAF, GPf, FEF, etc., may be used as the carbon black with an oil absorption amount of 0.5 cc/g or more.

The cross-linking agent type, the dynamic cross-linking conditions of temperature, cross-linking time, etc., and the like may be determined appropriately in response to the rubber composition and are not limited.

As the cross-linking agent, more particularly as an ion-family cross-linking agent, powder sulfur, precipitated sulfur, highly dispersed sulfur, surface-treatment sulfur, insoluble sulfur, di-morpholine di-sulfide, alkyl phenol di-sulfide, etch, is shown as an example. As the addition amount, for example, about 0.5 to 4 parts by weight may be used with respect to 100 parts by weight of rubber. As cross-linking agents of an organic peroxide family, benzoyl peroxide, t-butyl hydro peroxide, 2, 4-dichloro benzoyl peroxide, 2, 5-dimethyl-2, 5-di (t-butyl peroxy) hexane, 2, 5-dimethyl hexane-2, 5-di (peroxy benzoate), and the like are shown as an example. For example, about 1 to 15 parts by weight may be used with respect to 100 parts by weight of rubber.

Further, as cross-linking agents of a phenol resin family, a mixed cross-linking family containing halogen donor of tin chloride, chloroprene, etc., and alkyl phenol resin, bromide of alkyl phenol resin, and the like are shown as an example. For example, about 1 to 20 parts by weight may be used with respect to 100 parts by weight of rubber.

In addition, zinc oxide (about 5 parts by weight), magnesium oxide (about 4 parts by weight), litharge (about 10 to 20 parts by weight), p-quinone di-oxime, p-di-benzoyl quinone di-oxime, tetrachloro-p-benzoquinone, poly-p-dinitrosobenzene (about 2 to 10 parts by weight), and methylenedianiline (about 0.2 to 10 parts by weight) are shown as an example.

The rubber composition may contain a curing (cross-linking) agent, a curing (cross-linking) accelerating agent, an antioxidant, a bulking agent, a softening agent, a plasticizing agent, an anti-oxidizing agent, an ultraviolet absorbing agent, a coloring agent such as pigment or dye, etc., as required in addition to the above-mentioned conductivity giving agents.

The resin composition can be blended with a plasticizing agent, a compatibilizing agent, a curing (cross-linking) accelerating agent, an antioxidant, an anti-oxidizing agent, an ultraviolet absorbing agent, a coloring agent such as pigment or dye, or an addition agent such as an processing aid within the range of not impairing the objects of the invention in addition to the above-mentioned indispensable components.

Particularly, whether the conductivity giving agent is to be previously loaded to a rubber composition or to be loaded during kneading may be determined in response to the conductivity (polarity) difference between a thermoplastic resin forming a matrix and raw material rubber forming rubber particles. That is, if the polarity difference between the thermoplastic resin and the raw material rubber does not exist or is small, the conductivity giving agent may be previously loaded to the rubber composition or if the polarity of the raw material rubber is larger than that of the thermoplastic resin, the conductivity giving agent is loaded during kneading, whereby the conductivity giving agent can be made to exist on the interface between the rubber particles and the matrix more effectively.

The first semiconductive belt, the second semiconductive belt, the first semiconductive roll, and the second semiconductive roll of the invention will be discussed separately.

First Semiconductive Belt

The first semiconductive belt of the invention is a semiconductive belt having a base material and a surface layer and the base material is formed of a thermoplastic elastomer composition with an insulting thermoplastic resin as a matrix and rubber particles at least some of which have conductivity and at least some of which are cross-linked as domains. The semiconductive belt has a Young's modulus of 500 MPa or more and volume resistivity of $10^7$ to $10^{13}$ Ω cm.

The first semiconductive belt of the invention has volume resistivity ranging from $1\times10^7$ Ω cm to $1\times10^{13}$ Ω cm and preferably ranging from $1\times10^3$ Ω cm to $1\times10^{12}$ Ω cm.

The first semiconductive belt of the invention has the volume resistivity in the range mentioned above, whereby the following problems are eliminated in an image formation apparatus using the semiconductive belt as an intermediate transfer body:

When the volume resistivity is lower than $10^7$ Ω cm, the electrostatic force for holding charges on an unfixed toner image transferred from an image support to the intermediate transfer body does not work, so that toner is scattered in the surroundings of the image (blur) by the electrostatic repulsion of toners and the force of the fringe electric field in the vicinity of the image edges, and a large-noise image is formed. Particularly, this phenomenon appears noticeably in the image periphery with a large number of toners per unit area like a multiple transfer image, and leads to a critical defect for a color image formation apparatus.

If the volume resistivity exceeds $1\times10^{13}$ Ω cm, the electrostatic force for holding charges is large and thus the charges remain still after a multiple transfer image on the intermediate transfer body is transferred to paper and therefore it is necessary to place a static elimination mechanism before a primary transfer section.

Figure 3A:
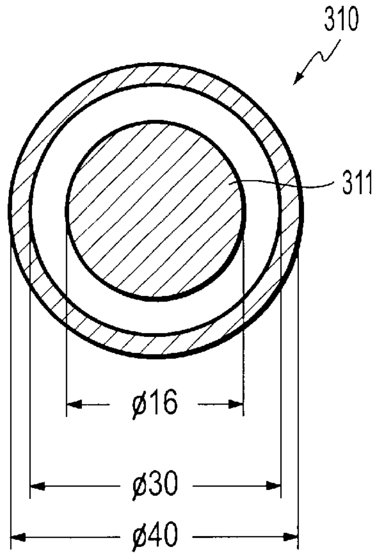
FIGS. 3A and 3B are drawing to show a measuring method of volume resistivity.
Figure 3B:
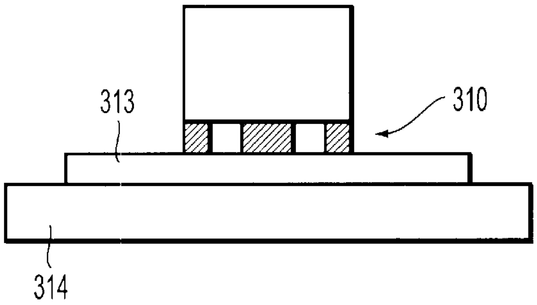

To measure the volume resistivity, using a circular electrode shown in FIG. 3 (HR probe of high-rester IP manufactured by Mitsubishi Yuka), a voltage of 100 V was applied and the volume resistivity was found from the current value in 30 minutes after the voltage was applied.

That is, the current value was measured in 30 minutes after 100 V was applied between an electrode 311 inside a ring electrode 310 shown in FIG. 3 and a metal plate 314 below a measured object 313 (here, belt), and the volume resistivity of the measured object 313 (belt) was found by calculation from the measured current value.

To produce the thermoplastic elastomer composition forming the first semiconductive belt of the invention, a conductivity giving agent is previously kneaded and a rubber pellet and a thermoplastic resin pellet for a matrix are entered in an extrusion machine such as a two-axis extrusion machine and are melted and kneaded. Preferably, a thermoplastic resin having a Young's modulus of 1000 MPa or more is selected as the thermoplastic resin for a matrix and kneading is executed so that the volume resistivity of the rubber pellet for a domain after being formed becomes $10^7$ Ω cm or less and that the volume fraction of the domain to the matrix becomes thermoplastic resin/rubber=30/70 to 90/10. A cross-linking agent is input consecutively before or during the melting and kneading and while the rubber component as the domain is dispersed in the resin component as the matrix, dynamic cross-linking is performed and rubber phase is fixed. The provided thermoplastic elastomer composition is water-cooled and is put into a pellet by a resin pelletizer.

If the viscosity ratio between the thermoplastic resin and rubber components is set to $$0.5<\eta_r/\eta_m<1.5$$

at the kneading time (where $\eta_r$ is the viscosity of the rubber component containing the conductivity giving agent when the rubber component is not cross-linked or is being cross-linked at the kneading temperature and $\eta_m$ is the viscosity of the thermoplastic resin), the rubber component is dispersed uniformly in the matrix and variations in volume resistivity of the provided semiconductive member (ΔR) can be placed within an order of magnitude (logΩ cm). Preferably, $0.7<\eta_r/\eta_m<1.3$.

Any thermoplastic resin material can be used as the thermoplastic resin (matrix) contained in the thermoplastic elastomer composition used with the first semiconductive belt of the invention if it is a thermoplastic resin material having a Young's modulus of 1000 MPa or more. Specifically, it is made of at least one resin selected from the group consisting of polyamide family, polyester family, polyimide family, polysulfide family, and polysulfone family resins.

To manufacture the first semiconductive belt of the invention, the thermoplastic elastomer composition can be molded as a belt shape by cylindrical molding and the cylinder can be cut in round slices to easily form endless belts. The belt provided by cylindrical molding (extrusion molding, inflation molding) is seamless and thus to use the belt as an intermediate transfer body, it is not necessary to perform control so as not to transfer a toner image to a belt seam.

Further, a material of low surface energy is used as a surface layer material of a semiconductive belt made up of two or more layers. The material of low surface energy is excellent in toner release and thus is excellent in transferability to a record medium in secondary transfer, so that high transfer image quality can be provided.

Figure 4:
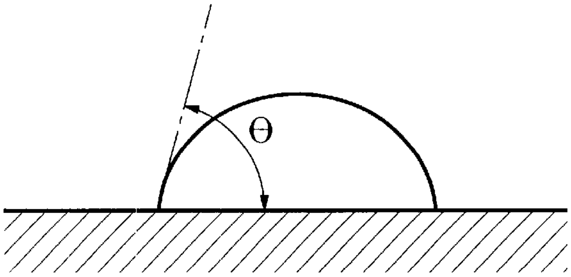
FIG. 4 is a sectional view of a test piece plane and a water drop to show a contact angle as the scale of surface energy.

The contact angle of the material of low surface energy with a water drop when represented as wettability of water, for example, becomes 85 degrees or more. The material forming the surface layer is used as a test piece and the wettability of water is represented with the contact angle of the test piece plane with a water drop as a scale. When a water drop is placed on the test piece surface, test piece surface tension $\gamma s$, interfacial tension between the liquid and the test piece, $\gamma i$, and liquid surface tension $\gamma l$ are balanced and one given shape is formed as shown in FIG. 4. At this time, if the liquid drop is small and the effect of gravity can be ignored, the following Young expression (2) is true and thus in the invention, the surface energy of the surface layer is represented as the contact angle $\tau$ between the surface layer plane and the water drop:

$$\gamma s=\gamma i+\gamma l \cos \tau \tag{2}$$

$$\cos \tau=(\gamma s-\gamma i)/\gamma l \tag{2'}$$

Further, a material comprising fluorine resin particles dispersed is used as the surface layer material of the material forming the first semiconductive belt of the invention. The material comprising fluorine resin particles dispersed is used as the surface layer material, whereby the surface layer becomes low surface energy and toner dirt on conductive belt can be prevented and the problem of toner on the belt making the transfer member dirt is eliminated.

The fluorine resin particles are not limited; for example, one or two or more of polyvinyl fluoride, PVDF, tetrafluoroethylene (TFE) resin, chlorotrifluoroethylene (CTFE) resin, ETFE, CTFE-ethylene copolymer, PEA (TFE-perfluoroalkyl vinyl ether copolymer), EPE (TFE-hexafluoropropylene (HFP) copolymer), EPE (TFE-HFP-perfluoroalkyl vinyl ether copolymer), etc. More particularly, KTL-500F manufactured by (Kabu) Kitamura having particle diameter 0.3 to 0.7 $\mu$m can be named as TFE resin powder.

Aliphatic polyester resin comprising polymer segments bound like straight chains such as bylon 30SS, bylon 200, or bylon 300 manufactured by Toyobo (Kabu), polyurethane resin having soft segments in molecules, fluororubber, etc., is preferred as the material comprising fluorine resin particles dispersed. Since the resins have flexibility, the surface layer can be given flexibility.

The above-mentioned conductive agent is used as a conductive agent dispersed on the surface layer; carbon black is preferred from the viewpoint of costs. For example, furnace black, acetylene black, ketjen black, channel black, etc., can be named as the carbon black.

Specifically, conductive paint comprising proper amounts of PTFE (polytetrafluoroethylene) resin particles and carbon black dispersed in the aliphatic polyester resin such as bylon 30SS, bylon 200, or bylon 300 manufactured by TOYOBO Co., Ltd. mentioned above, emularon 345ESD and emularon JYL601ESD of Acheson Japan Limited comprising carbon black dispersed in water emulsion paint containing PTFE (polytetrafluoroethylene) resin, NF-940 manufactured by Daikin Kougyou (Kabu) comprising FEP (tetrafluoroethylene-hexafluoropropylene copolymer) resin particles and carbon black dispersed in fluororubber, etc., can be named.

To apply a coating to the surface layer, brush application, a method, a spray method, a roll coater method, etc., can be adopted; for example, a surface layer generally 10 to 60 $\mu$m thick, preferably 15 to 30 $\mu$m thick can be formed by the spray method. If the film thickness is less than 10 $\mu$m, it is feared that the surface layer may be worn and rubber layer may be exposed while press contact with an image support is repeated, and to form the surface layer by the method of applying a coating, it becomes difficult to form a uniform film. On the other hand, if the film thickness exceeds 60 $\mu$m, liquid drips easily occur on the surface and it becomes difficult to form a smooth and uniform coat film stably.

Second Semiconductive Belt

The second semiconductive belt of the invention is a semiconductive belt having a thermoplastic elastomer member formed of a thermoplastic elastomer composition having a thermoplastic resin as a matrix and rubber particles at least some of which are cross-linked as domains and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ $\Omega$ cm, and variations in volume specific resistance value (R) being within to the power of one; in particular the semiconductive belt is a transfer belt.

The second semiconductive belt of the invention may be formed of a thermoplastic elastomer member of a belt-like molded article of a thermoplastic elastomer composition and may have a reinforcing layer of a resin fiber layer, etc., at the center and a thermoplastic elastomer composition above and below the reinforcing layer. The shape may be determined matching print paper, but it is desirable that the thickness is 50 $\mu$m to 2000 $\mu$m.

The thermoplastic elastomer member has a Young's modulus of 500 MPa or more, preferably 1000 MPa or more, because when the thermoplastic elastomer member is used as a belt, it is less extended and age extension after use of the thermoplastic elastomer member a large number of times is less in the range of the Young's modulus.

To place the Young's modulus of the thermoplastic elastomer member in the range, preferably the Young's modulus of the matrix in the thermoplastic elastomer molded article is set to 1000 MPa or more and further is set to 2000 MPa or more.

To place the Young's modulus of the matrix in the range, preferably polyamide family resin, polyester family resin, polyimide family resin, polysulfide family resin, polysulfone family resin, or the like is used as the thermoplastic resin forming the matrix, or a mixture of the resins may be used. an elastomer of the resins and any other copolymerization component may be used. For example, nylon 6, nylon 66, nylon 46, MXD6 nylon, nylon 6T, amorphous nylon, etc., can be named as the polyamide family resin. PET, PET, polyarylate, PBN, liquid crystal polyester, etc., can be named as the polyester family resin; polyimide, polyether-imide, polyamide-imide, etc., can be named as the polyimide family resin; PPS can be named as the polysulfide family resin; and polyethersulfone, polysulfone, etc., can be named as the polysulfone family resin.

In the second semiconductive belt of the invention, the volume specific resistance value of the thermoplastic elastomer member is $10^6$ to $10^{13}$ Ω cm preferably $10^7$ to $10^{11}$ Ω cm. In the range, uniform charging and transfer are enabled.

To place the volume specific resistance value of the semiconductive belt having the thermoplastic elastomer member in the range, preferably the volume specific resistance value of the domain is set to $10^7$ Ω cm or less and more preferably is set to $10^2$ to $10^5$ Ω cm.

One feature of the invention is that variations in volume specific resistance value (R) are within to the power of one. Thus, to use the belt of the invention for transfer, an image excellent in uniformity of image density with no inconsistencies in color can be provided.

The variations in volume specific resistance value (R) mean as follows: when the belt is expanded to a rectangle with the length direction of the belt surface as X axis and the width direction as Y axis and the rectangle is checked at 3-cm intervals in the X and Y axes and the volume specific resistance values of 10 cells are measured, the variation width between the maximum value and the minimum value is within to the power of one.

To place the variations in volume specific resistance value (R) within to the power of one, preferably molding is executed by the following molding method under the following condition, but the molding method is not limited.

To produce the thermoplastic elastomer composition forming the second semiconductive belt of the invention like the thermoplastic elastomer composition forming the first semiconductive belt of the invention, a conductivity giving agent is previously kneaded and a rubber pellet and a thermoplastic resin pellet for a matrix are entered in an extrusion machine such as a twin-screw kneader and are melted and kneaded. Preferably, a thermoplastic resin having a Young's modulus of 1000 MPa or more is selected as the thermoplastic resin for a matrix and kneading is executed so that the volume resistivity of the rubber pellet for a domain after being formed becomes $10^7$ Ω cm or less and that the volume fraction of the domain to the matrix becomes 30/70 to 90/10. A cross-linking agent is input consecutively before or during the melting and kneading and while the rubber component as the domain is dispersed in the resin component as the matrix, dynamic cross-linking is performed and rubber phase is fixed. The provided thermoplastic elastomer composition is water-cooled and is put into a pellet by a resin pelletizer.

If the viscosity ratio between the thermoplastic resin and rubber components is set to $$0.5<\eta_r/\eta_m<1.5$$

at the kneading time (where ηr is the melt viscosity of the uncross-linked rubber component containing the conductivity giving agent at the kneading temperature and ηm is the melt viscosity of the thermoplastic resin), the rubber component is dispersed uniformly in the matrix and variations in volume specific resistance value of the thermoplastic elastomer member of the belt provided (R) can be placed within to the power of one. Preferably, $0.7<\eta_r/\eta_m<1.3$.

Next, the thermoplastic elastomer composition can be molded as a belt shape by cylindrical molding. The cylinder is cut in round slices to easily form endless belts. The belt provided by cylindrical molding (inflation molding) is seamless and thus operates smoothly and is excellent in durability.

Further, to give a resistance layer to the surface, a coating may be applied to the belt surface or cylindrical molding may be previously performed as two layers with the thermoplastic elastomer composition of the invention and a resistance layer may be given at the molding time.

First Semiconductive Roll

The first semiconductive roll of the invention is a semiconductive roll comprising a core, a foam surrounding the core, and an elastic layer formed of a thermoplastic elastomer composition comprising an insulating thermoplastic resin as a matrix and rubber particles at least some of which have conductivity and at least some of which are cross-linked as domains, surrounding the foam, and having ASKER C hardness of 25 to 70 degrees and volume resistivity of $10^4$ to $10^{12}$ Ω cm.

The first semiconductive roll of the invention comprises the foam on the outer periphery of the core and the semiconductive elastic layer on the outer periphery of the foam, whereby ASKER C hardness of 25 to 70 degrees can be accomplished as the roll hardness, and the surface of the first semiconductive roll is coated with the elastic layer, whereby occurrence of charge unevenness and transfer unevenness caused by the effect of foam cells (foam portion) can be eliminated.

The first semiconductive roll of the invention comprises the foam on the outer periphery of the core and the semiconductive elastic layer on the outer periphery of the foam.

The core of the roll is not limited; metal cores of stainless (SUS), iron, Ni-plated iron, aluminum, etc., are shown for example. The outer diameter of the core is not limited; the outer diameter in the range of 3 to 20 mm can be shown for example. The foam is placed on the outer periphery of the core and the semiconductive elastic layer is provided on the outer periphery of the foam, whereby ASKER C hardness of 25 to 70 degrees can be accomplished as the roll hardness required for a charging roll or a transfer roll, and nip width (2 to 5 mm) can be uniformly provided at low nip pressure and occurrence of charge unevenness and transfer unevenness caused by nonuniformity of nip can be eliminated.

Preferably, the thickness of the semiconductive elastic layer is 1 to 5 mm. If the thickness is less than 1 mm, charge unevenness or transfer unevenness caused by the effect of foam cells (foam portion) of the underlying layer may occur. If the thickness exceeds 5 mm, the nip pressure needs to be increased to follow deformation of the underlying foam layer.

The hardness of the semiconductive elastic layer is JIS A hardness 25 to 70 degrees, preferably 25 to 40 degrees, because in the range, elasticity of the roll can be provided in an appropriate range and a uniform nip width can be provided between the elastic layer and the opposed member such as an image support. The outer diameter of the roll, 5 to 50 mm can be shown for example.

As the foam layer, an insulating foam layer or a conductive foam layer may be used. To use an insulating foam layer, an electrode roll is placed at a position opposed to a charge section (transfer section) and conduction passage is a flow of the elastic layer of the thermoplastic elastomer composition on roll creepage. To use a conductive foam layer, the volume resistivity of the foam layer is set lower than that of the elastic layer. The volume resistivity of the elastic layer is set higher than that of the foam layer, whereby the resistance value of the roll is dominated by the elastic layer, so that variations in conductive roll can be decreased as the thermoplastic elastomer composition having less resistance variations is used as the elastic layer.

The volume resistivity of the first semiconductive roll of the invention is $10^4$ Ω cm to $10^{12}$ Ω cm. For example, to use the first semiconductive roll as a charging roll; it is used in the range of $10^4$ Ω cm to $10^{10}$ Ω cm. If the volume resistivity is less than $10^4$ Ω cm, when a defect such as a pinhole occurs on an image support, an electric current concentrates on it, breaking the image support. If the volume resistivity exceeds $10^{10}$ Ω cm, a high voltage is required and thus it is made impossible to charge the image support. To use the first semiconductive roll as a transfer roll, it is used in the range of $10^5$ Ω cm to $10^{12}$ Ω cm.

To produce the thermoplastic elastomer composition forming the elastic layer of the first semiconductive roll of the invention, a conductivity giving agent is previously kneaded and a rubber pellet and a thermoplastic resin pellet for a matrix are entered in an extrusion machine such as a two-axis extrusion machine and are melted and kneaded. Preferably, a thermoplastic resin having a tensile elastic modulus of 50 MPa or less is selected as the thermoplastic resin for a matrix and kneading is executed so that the volume resistivity of the rubber pellet for a domain after being formed becomes $10^8$ Ω cm or less and that the volume fraction of the domain to the matrix becomes thermoplastic resin/rubber=25/75 to 90/10.

A cross-linking agent is input consecutively before or during the melting and kneading and while the rubber component as the domain is dispersed in the resin component as the matrix, dynamic cross-linking is performed and rubber phase is fixed. The provided thermoplastic elastomer composition is water-cooled and is put into a pellet by a resin pelletizer.

If the viscosity ratio between the thermoplastic resin and rubber components is set to $$0.5<\eta_r/\eta_m<1.5$$

at the kneading time (where $\eta_r$ is the viscosity of the rubber component containing the conductivity giving agent when the rubber component is not cross-linked or is being cross-linked at the kneading temperature and $\eta_m$ is the viscosity of the thermoplastic resin), the rubber component is dispersed uniformly in the matrix and variations in volume resistivity of the provided semiconductive member (ΔR) can be placed within an order of magnitude (logΩ cm).

Preferably, $0.7<\eta_r/\eta_m<1.3$.

Any thermoplastic resin material can be used as the thermoplastic resin (matrix) contained in the thermoplastic elastomer composition of the invention if it is a thermoplastic resin material having a tensile elastic modulus of 50 MPa or less. Specifically, it is made of at least one resin selected from the group consisting of styrene family, olefin family, urethane family, polyamide family, and polyester family resins. A thermoplastic resin material having a tensile elastic modulus of 50 MPa or less is used, whereby the hardness of the thermoplastic elastomer composition can be set to JIS A hardness 25 to 70 degrees.

To manufacture the first semiconductive roll of the invention, a method of coating the surroundings of the core coated with the foam with the thermoplastic elastomer composition by extrusion molding and then cutting to constant length to mold rolls can be adopted.

After molding, asperities on the surface can also be made uniform by grinding, etc., to improve surface coarseness.

Further, a material of low surface energy is used as a surface layer material or the semiconductive roll. The material of low surface energy is excellent in toner release and thus toner dirt, etc., on the charging roll does not occur, so that charge unevenness does not occur either.

The material of low surface energy, the conductive agent dispersed on the surface layer of the semiconductive roll made of the material of low surface energy, the method of applying a coating to the surface layer, and the like are similar to those concerning the first semiconductive belts of the invention and therefore will not be discussed again.

To use the semiconductive roll as a transfer roll with an image formation apparatus described later, the roll is placed on the rear of a belt with respect to the transfer face of the belt where a toner image is transferred, so that toner dirt less occurs and therefore no problem arises if the surface is not coated with a low surface energy material such as a fluorine family, etc.

Second Semiconductive Roll

The second semiconductive rolls of the invention include a charging roll, a transfer roll, etc., used with electrophotograph, a copier, a laser beam printer, a facsimile, etc.

The second semiconductive roll of the invention is a semiconductive roll comprising a semiconductive thermoplastic elastomer member formed like a cylinder on the outer periphery of a core with the thermoplastic elastomer member being formed of a thermoplastic elastomer composition having a thermoplastic resin as a matrix and rubber particles at least some of which are cross-linked as domains and comprising the rubber particles at least some of which have conductivity with the volume specific resistance value of the rubber particle being smaller than that of the thermoplastic resin, JIS A hardness being 25 to 50 degrees, the volume specific resistance value being $10^6$ to $10^{12}$ Ω cm, and variations in volume specific resistance value (R) being within to the power of one; in particular the semiconductive roll is a transfer roll.

The core of the second semiconductive roll of the invention is not limited; metal cores of stainless (SUS), iron Ni-plated iron, aluminum, etc., are shown for example. The outer diameter of the core is not limited; the outer diameter in the range of 3 to 20 mm can be shown for example.

The thermoplastic elastomer member molded on the semiconductive roll of the invention is formed of a molded article of a thermoplastic elastomer member composition described later.

The thickness of the thermoplastic elastomer member is not limited; preferably it is 2 mm or more. The outer diameter of the thermoplastic elastomer member becomes the outer diameter of the roll; the outer diameter in the range of 5 to 50 mm can be shown for example.

The thermoplastic elastomer member has JIS A hardness of 25 to 50 degrees, preferably 25 to 40 degrees. In the range, elasticity of the roll is provided in an appropriate range and sufficiently following reverse motion of copy paper, a toner image can be transferred onto transfer paper appropriately.

A resistance layer can also be formed on the semiconductive thermoplastic elastomer member. When a defect such as a pinhole occurs on a photosensitive body, an electric current concentrates on it, breaking a charge member and the photosensitive body. Then, the resistance layer is provided for preventing it. Generally, impregnating or coating is executed in paint comprising conductive fine particles of carbon black, metal oxide (titanium oxide, tin oxide, etc.,), or the like dispersed in a high molecular compound of urethane, acrylic, nylon, or the like, and heating is performed for drying, then hardening is executed.

To harden the coat by heating and drying, the laminated coat is dried and hardened or drying and hardening may be performed each time at the coat applying time. As the paint liquid of the resistance layer, not only an organic solvent family, but also a water emulsion dried comparatively slowly may be used.

To form the resistance layer, resistance layer paint liquid is applied onto the semiconductive roll at least twice or more, whereby a conductive coat is reliably deposited and fixed on the surface of the semiconductive roll and the resistance layer with no pinholes, etc., on the surface can be formed, so that pinhole leak of the charge member and the photosensitive body caused by concentration of an electric current can be prevented. If several conductive coatings different in resistance or having the same resistance are applied, weight reduction, surface elasticity, and smoothness can be given. Preferably, the resistance layer is 3 to 30 $\mu$m thick.

To place the JIS A hardness of the semiconductive thermoplastic elastomer member in the above-mentioned range, the 100% tensile elastic modulus of the matrix in the thermoplastic elastomer molded article is set to 50 MPa or less, preferably 20 MPa or less.

To place the tensile elastic modulus of the matrix in the range, a thermoplastic elastomer, etc., of polyolefin family resin, polyamide family resin, polyester family resin, polystyrene family resin, polynitrile family resin, polymethacrylate family resin, polyvinyl family resin, cellulose family resin, fluorine family resin, imide family resin, etc., can be used as the thermoplastic resin forming the matrix. Particularly, more preferably a thermoplastic elastomer of a styrene family, an olefin family, a urethane family, a polyester family, or a polyamide family is used to make the roll softer.

A polystyrene/polybutadiene copolymer (SBS) and its hydrofined substance (SEBS) and a polystyrene/polyisoprene copolymer (SIS) and its hydrofined substance (SEPS) can be named as the thermoplastic elastomer of the styrene family.

A copolymer of polypropylene and ethylene, α-olefin/polyethylene copolymer, etc., can be named as the thermoplastic elastomer of the olefin family; polyether family and polyester family urethane can be named as the thermoplastic elastomer of the urethane family; and a block copolymer of polyester and polyether and the like can be named as the thermoplastic elastomer of the polyester family.

The volume specific resistance value of the thermoplastic elastomer member is $10^6$ to $10^{12}$ Ω cm, preferably $10^7$ to $10^{13}$ Ω cm in the second semiconductive roll of the invention. In the range, uniform charging and transfer are enabled.

To place the volume specific resistance value of the whole thermoplastic elastomer member in the range, preferably the volume specific resistance value of the domain is set to $10^6$ Ω cm or less and more preferably is set to $^{3}$ Ω cm or less.

One feature of the invention is that variations in volume specific resistance value (R) are within to the power of one. Thus, if the roll of the invention is used for transfer, an image excellent in uniformity of image density with no inconsistencies in color can be provided.

The variations in volume specific resistance value (R) mean as follows: When the roll is expanded to a rectangle with the circumferential direction of the roll surface as X axis and the length direction as Y axis and the rectangle is checked at 2-cm intervals in the X and Y axes and the volume specific resistance values are measured at the intersection points, the variation width between the maximum value and the minimum value (R) is within to the power of one.

Preferably, the volume fraction of the domain to the matrix is 10/90 to 90/10 and more preferably 80/20 to 30/70, because excellent balance of the elastic modulus and the resistance value of the whole roll is provided in the range. The range of the long surface coarseness of the roll of the invention is 1 to 10 $\mu$m in the roll shaft direction, preferably 2 to 9 $\mu$m.

To manufacture the roll of the invention, a method of coating the continuous core surroundings with the thermoplastic elastomer composition having a constant thickness by extrusion molding and then cutting to constant length to make rolls may be adopted, or a method of previously inserting a standard-length core into a metal mold and coating the outside with the thermoplastic elastomer by injection molding may be adopted.

After molding, if there are variations in surface coarseness, asperities on the surface can also be made uniform by grinding, etc.

[Embodiments of the Invention]

Referring now to the accompanying drawings, there are shown preferred embodiments of the invention.

Figure 6:
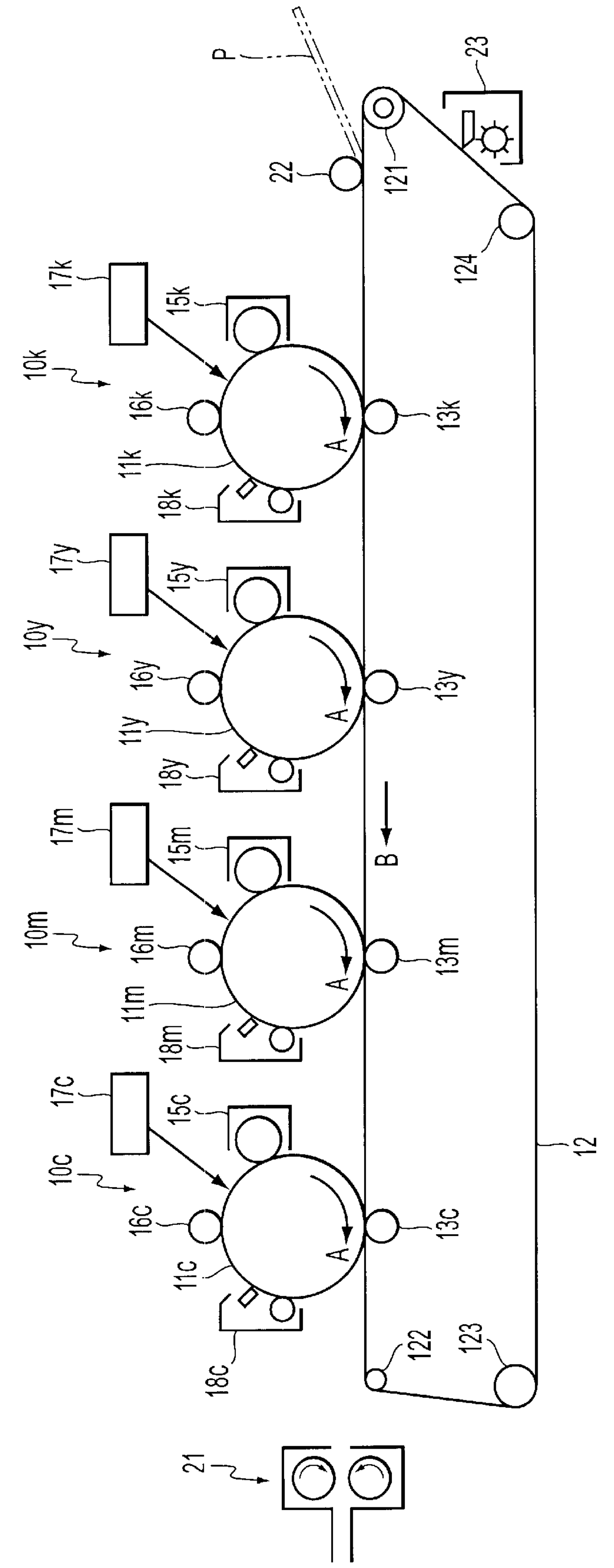
FIG. 6 is a schematic drawing to show another embodiment of image formation apparatus of the invention.

An image formation apparatus of the invention is not limited if it is an image formation apparatus. For example, the invention is applied to a normal single-color image formation apparatus storing only single-color toner in a developing unit, a color image formation apparatus for repeating primary transfer of a toner image supported on an image support such as a photoconductive drum to an intermediate transfer body in sequence, a tandem-type color image formation apparatus comprising a plurality of image supports each comprising developing machines provided in a one-to-one correspondence with colors arranged on an intermediate transfer body in series, and the like. It is also applied to a transfer transport belt material 12 of a tandem-type color image formation apparatus as shown in FIG. 6.

Figure 5:
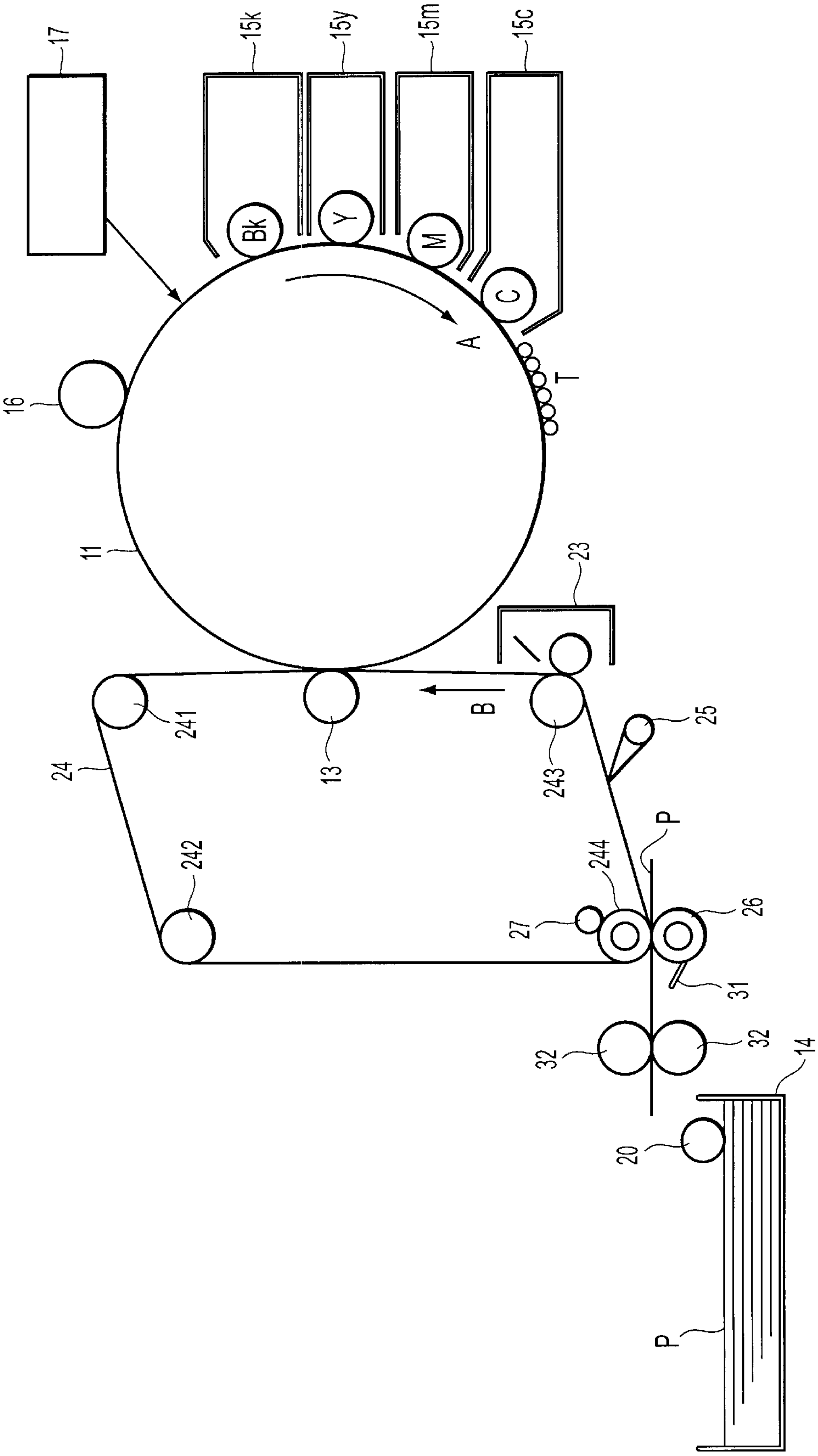
FIG. 5 is a schematic drawing to show one embodiment of an image formation apparatus of the invention.

FIG. 5 shows an outline of a color image formation apparatus for repeating primary transfer as an example. The color image formation apparatus shown in FIG. 5 corresponds to one embodiment of the first, second, fourth, and fifth image formation apparatus of the invention.

FIG. 5 is a schematic drawing to describe the main part of one embodiment of image formation apparatus of the invention. The image formation apparatus shown in FIG. 5 comprises a photoconductive drum 11 as an image support, a transfer belt 24 as an intermediate transfer body, a bias roll 26 of a transfer electrode, a paper tray 14 for supplying paper P of a transfer medium, a charging roll 16 for primarily charging the surface of the photoconductive drum 11, an image writer 17 for writing an electrostatic latent image onto the photoconductive drum 11, developing units **15*k*, 15*y*, 15*m*, and 15*c* for developing in B (black), yellow (Y), magenta (N), and cyan (C) toners respectively, a belt cleaner 23 for cleaning the transfer belt 24, a strip claw 25 for stripping paper P from the transfer belt 24, belt rollers 241, 242, and 243 and a backup roll 244 on which the transfer belt 24 is placed, a transfer roll 13, an electrode roll 27, a cleaning blade 31, a pickup roller 20, and a feed roller 32**.

In FIG. 5, the photoconductive drum 11 is rotated in the arrow A direction and has a surface charged uniformly by means of the charging roll 16. An electrostatic latent image of a first color (for example, B) is formed on the charged photoconductive drum 11 by the image writer 17 of a laser writer, etc.

The electrostatic latent image is toner-developed by the developing unit **15*k* to form a visible toner image T. As the photoconductive drum 11** is rotated, the toner image T arrives at a primary transfer section in which the transfer roll 13 is placed, and an electric field of an opposite polarity is applied from the transfer roll 13 to the toner image T, whereby the toner image T is primarily transferred electrostatically to the transfer belt 24.

Likewise, a toner image of a second color, a toner image of a third color, and a toner image of a fourth color are formed in sequence and are superposed on each other on the transfer belt 24 to form a multiple toner image. As the transfer belt 24 is rotated, the multiple toner image transferred to the transfer belt 24 arrives at a secondary transfer section in which the bias roll 26 is placed.

The secondary transfer section is made up of the bias roll 26 installed on the surface of the transfer belt 24 on which the toner image is supported, the backup roll 244 placed so as to face the bias roll 26 from the rear of the transfer belt 24, and the electrode roll 27 pressed against the backup roll 244 and rotated.

The paper P is taken out one sheet at a time by the pickup roller 20 from a paper bundle stored in the paper tray 14 and is fed at a predetermined timing by the feed roll 43 into the space between the transfer belt 24 and the bias roll 26 in the secondary transfer section.

The fed paper P is pressed and transferred by the bias roll 26 and the backup roll 244 and the transfer belt 24 is rotated, whereby the toner image supported on the transfer belt 24 is transferred to the paper P.

The strip claw 25 at a retreat position until termination of the primary transfer of the final toner image is operated, whereby the paper P to which the toner image is transferred is stripped from the transfer belt 24 and is transported to a fuser (not shown) and the toner image is fixed by pressurization/heating treatment to provide a permanent image.

The remaining toner on the transfer belt 24 where transfer of the multiple toner image to the paper P is complete is removed by the belt cleaner 23 placed downstream from the secondary transfer section for the next transfer. The cleaning blade 31 made of polyurethane, etc., is attached to the bias roll 26 so as to always abut the bias roll 26 for removing foreign substances of toner particles, paper powder, etc., deposited as the transfer is executed.

To transfer a single-color image, the primarily transferred toner image T immediately is secondarily transferred and is transferred to the fuser. To transfer a multi-color image by superposing multiple colors on each other, rotation of the transfer belt 24 and rotation of the photoconductive drum 11 are synchronized with each other so that the toner images of the colors match accurately in the primary transfer section.

In the secondary transfer section, voltage of the same polarity as the polarity of the toner image (transfer voltage) is applied to the electrode roll 27 pressed against the backup roll 244 placed facing the bias roll 26 with the transfer belt 24 between, whereby the toner image T is transferred to the paper P by electrostatic repulsion.

In the embodiment shown in FIG. 5, the transfer belt 24 corresponds to one example of the first or second semiconductive belt of the invention.

In the embodiment shown in FIG. 5, each of the charging roll 16, the transfer roll 13, the backup roll 244, and the bias roll 26 corresponds to one example of the first or second semiconductive roll of the invention.

FIG. 6 is a schematic configuration drawing of another embodiment of image formation apparatus of the invention. The image formation apparatus shown in FIG. 6 corresponds to one embodiment of the first, third, fourth, and fifth image formation apparatus of the invention.

The image formation apparatus illustrated in FIG. 6 is a tandem-type color image formation apparatus wherein four image formation units 10*k*, 10*y*, 10*m*, and 10*c* for forming black (K), yellow (Y), magenta (M), and cyan (C) color toner images are arranged in order and a paper transport belt 12 for transporting paper P so as to allow the paper P to pass through transfer sections of the image formation units 10*k*, 10*y*, 10*m*, and 10*c* (transfer sections of photoconductive drums) is disposed. The image formation units 10*k*, 10*y*, 10*m*, and 10*c* comprise photoconductive drums 11*k*, 11*y*, 11*m*, and 11*c* rotated in the arrow A direction, which are surrounded by charging rolls 16*k*, 16*y*, 16*m*, and 16*c*, writers 17*k*, 17*y*, 17*m*, and 17*c*, developing units 15*k*, 15*y*, 15*m*, and 15*c* for developing in single-color toners of K, Y, M, and C, transfer rolls 13*k*, 13*y*, 13*m*, and 13*c*, cleaning units 18*k*, 18*y*, 18*m*, and 18*c*, and the like in order. The paper transport belt 12 is placed on a plurality of rolls 121, 122, 123, and 124 so as to come in contact with the transfer sections of the image formation units 10*k*, 10*y*, 10*m*, and 10*c* and rotate in the arrow direction.

The image formation apparatus shown in FIG. 6 further includes a fuser 21, a paper attraction roll 22, and a belt cleaning unit 23.

In the image formation apparatus, paper P transported from a paper feed section (not shown) is transported in the arrow B direction so as to allow the paper P to pass through the transfer sections of the image formation units 10*k*, 10*y*, 10*m*, and 10*c* with the paper P attracted and supported on the paper transport belt 12, whereby toner images formed by the image formation units 10*k*, 10*y*, 10*m*, and 10*c* are transferred to the paper P so that the toner images are superposed on each other, then the paper P is stripped from the paper transport belt 12 and is fed into the fuser 21, which then fixes the toner image on the paper P for providing a color image. In the embodiment, a semiconductive belt 0.3 mm thick having a perimeter of 845 mm (one example of semiconductive belt of the invention) is used as the paper transport belt 12.

In the image formation apparatus shown in FIG. 6, each of the charging rolls 16*k*, 16*y*, 16*m*, and 16*c* and the transfer rolls 13*k*, 13*y*, 13*m*, and 13*c* corresponds to an embodiment of the first or second semiconductive roll of the invention.

Figure 7:
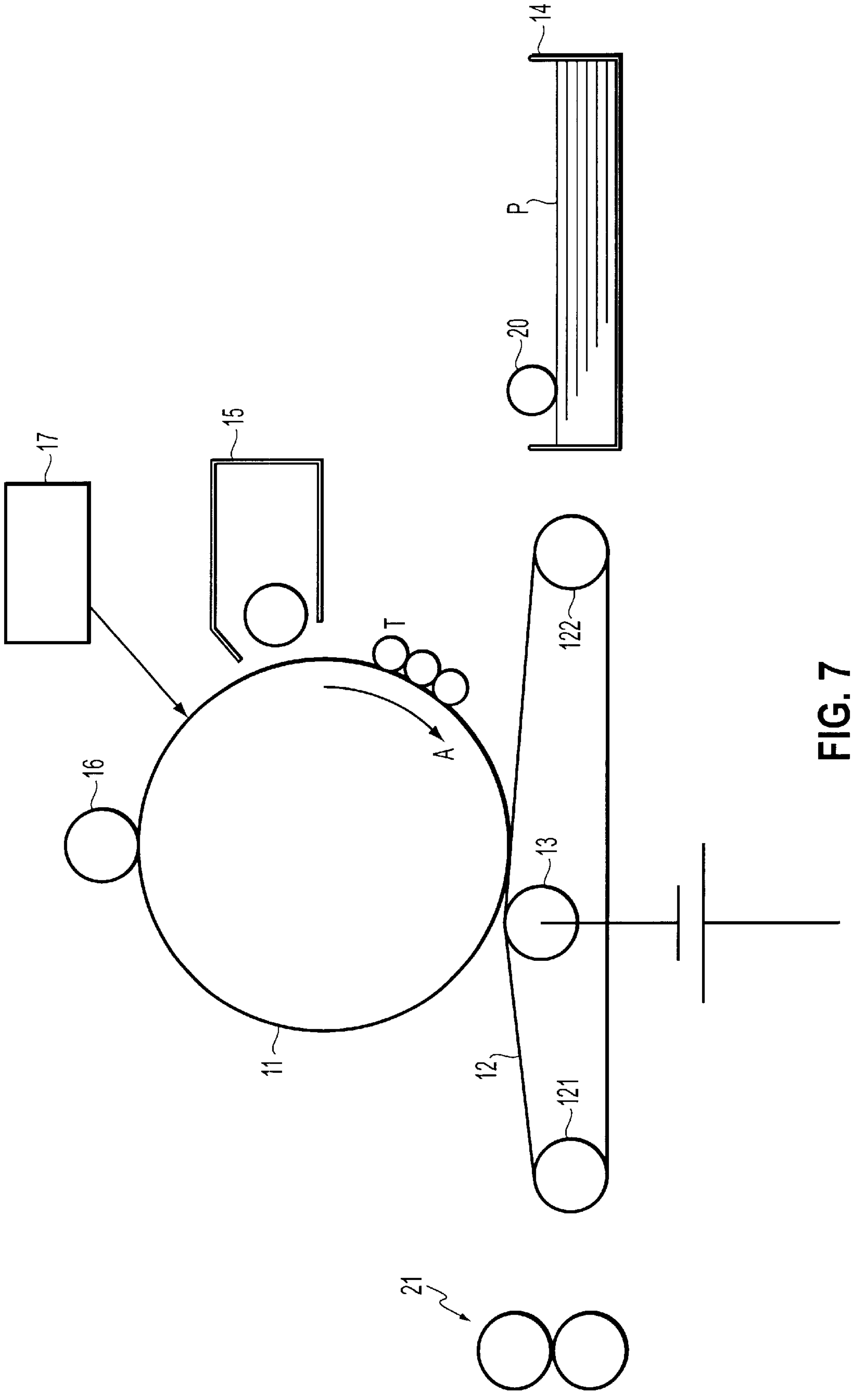
FIG. 7 is a schematic drawing to describe the main part of another embodiment of image formation apparatus of the invention.

FIG. 7 is a schematic drawing to describe the main part of another embodiment of image formation apparatus of the invention. The image formation apparatus shown in FIG. 7 corresponds to one embodiment of the first, third, fourth, and fifth image formation apparatus of the invention.

The image formation apparatus shown in FIG. 7 comprises a photoconductive drum 11 as an image support, a transfer transport belt 12, a bias roll 13 of a transfer electrode, a paper tray 14 for storing paper P of a transfer medium and supplying the paper P in sequence, a developing unit 15 for developing in B (black) toner, a charging roll 16, an image writer 17, belt rollers 121 and 122, a pickup roller 20, and a fuser 21.

In FIG. 7, the photoconductive drum 11 is rotated in the arrow A direction and has a surface charged uniformly by means of the charging roll 16. The charging roll 16 corresponds to one embodiment of the first or second semiconductive roll of the invention. An electrostatic latent image of B (black) is formed on the charged photoconductive drum 11 by the image writer 17 of a laser writer, etc.

The electrostatic latent image is toner-developed by the developing unit 15 to form a visible toner image T. As the photoconductive drum 11 is rotated, the toner image T arrives at a transfer section in which the bias roll 13 is placed, and an electric field of an opposite polarity is applied from the transfer roll 13 to the toner image T, whereby the toner image T is transferred electrostatically to the paper P attracted on the transfer belt 12. The bias roll 13 also corresponds to one embodiment of the first or second semiconductive roll of the invention.

The paper P to which the toner image is transferred is transported on the transfer belt 12 to the fuser 21 and the toner image is fixed by pressurization/heating treatment to provide a permanent image. The transfer belt 12 corresponds to one embodiment of the first or second semiconductive belt of the invention.

In the image formation apparatus shown in FIG. 7, a metal roll having an outer diameter of 10.5 mm is used as the conductive roller 121, 122. An elastic belt 0.5 mm thick and 320 mm wide having a perimeter of 264 mm is used as the transfer transport belt 12.

Figure 8:
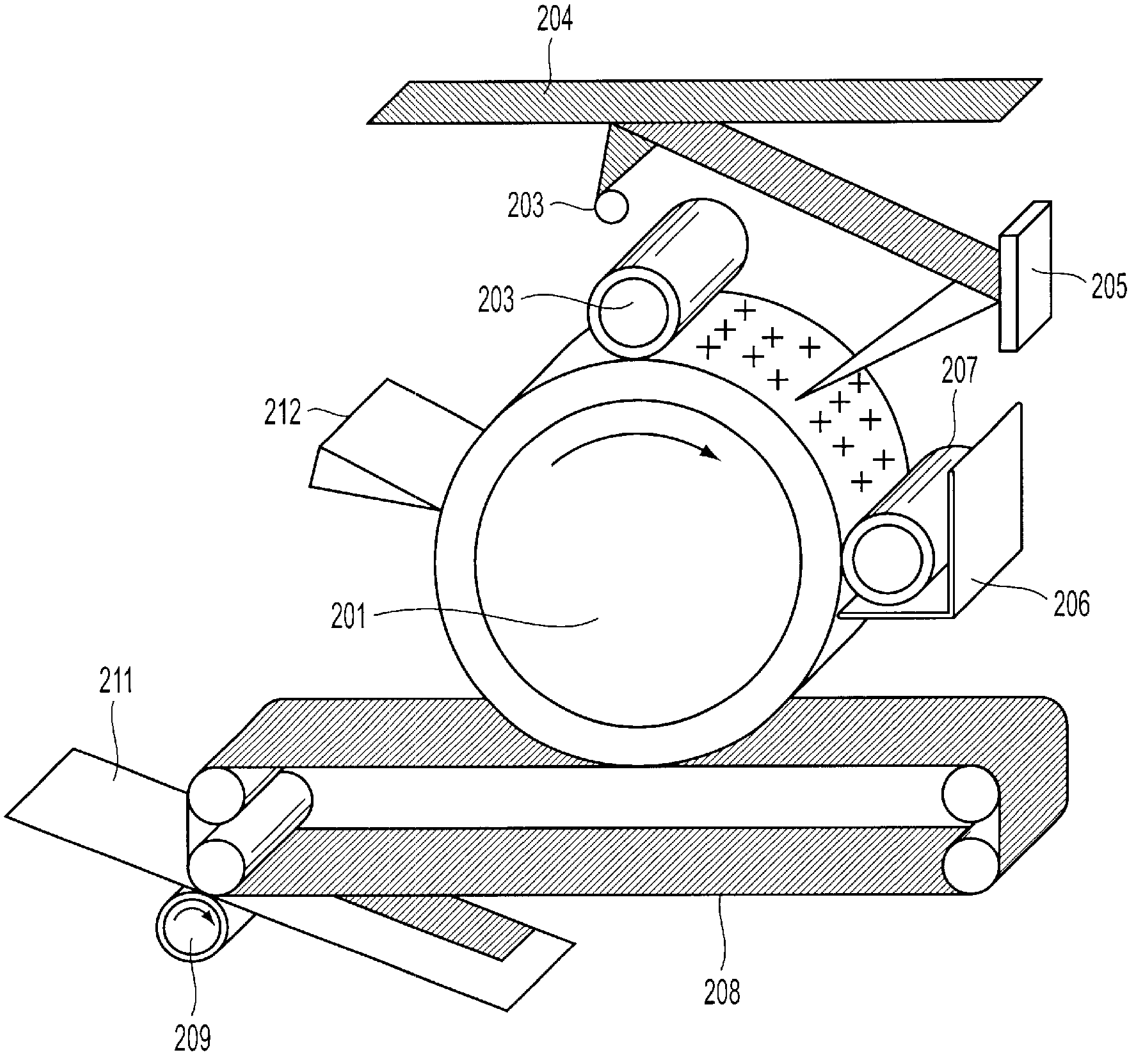
FIG. 8 is a schematic drawing of another embodiment of image formation apparatus of the invention.

FIG. 8 is a schematic drawing of another embodiment of image formation apparatus of the invention. The image formation apparatus shown in FIG. 8 corresponds to one embodiment of the first and second image formation apparatus of the invention.

In FIG. 8, an image support is a photoconductive drum 201 using an organic photoconductor, etc. This photoconductive drum 201 is rotated in the arrow direction by drive means (not shown). The photoconductive drum 201 has a surface charged to a predetermined potential by a charging roll 202 coming in contact with the surface of the photoconductive drum 201.

Then, image exposure output in response to image information is applied to the surface of the photoconductive drum 201 from a laser writer for applying a light source 203 to original paper 204 and applying laser light corresponding to the original paper to the photoconductive drum 201 by means of a mirror 205, thereby forming an electrostatic latent image on the photoconductive drum 201.

The electrostatic latent image formed on the photoconductive drum 201 is developed into a toner image by a developing roll 207 using toner 206, then the toner image is divided into portions of four colors of magenta, yellow, cyan, and black by a transfer belt 208 and transferred to the transfer belt 208. The transferred images in the separate colors on the transfer belt 208 are transferred by static electricity of a transfer roll 209 onto copy paper 211 inverted at a predetermined timing. The transfer roll 209 is energized with a constant current as a transfer current. The transfer belt 208 corresponds to one example of the first or second semiconductive belt of the invention.

The copy paper 211 to which the toner image is transferred is transported to a fuser (not shown) and the toner image is fixed to complete an image. The remaining toner on the surface of the photoconductive drum 201 where the toner image transfer step is complete is removed by a cleaning unit such as a blade 212, and the photoconductive drum 201 is used for the next image formation process.

Figure 9:
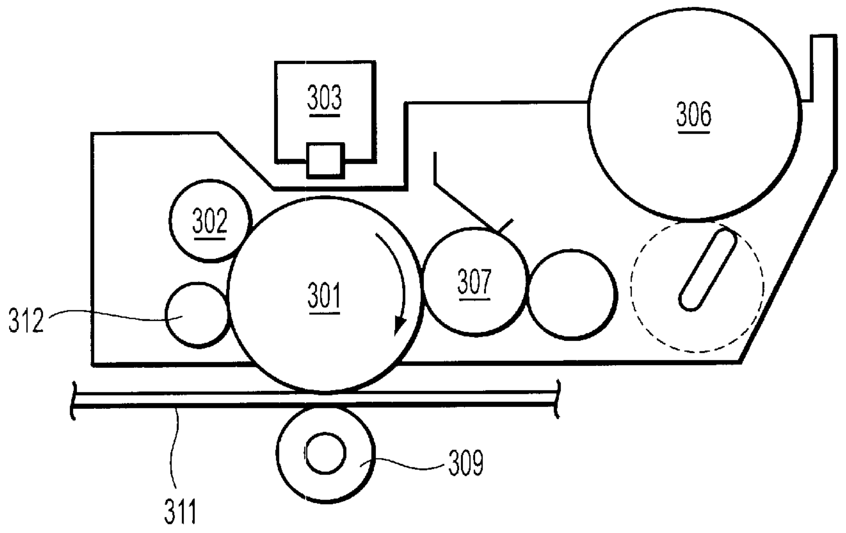
FIG. 9 is a schematic drawing to show a different embodiment of image formation apparatus of the invention.

FIG. 9 is a schematic drawing to show a different embodiment of image formation apparatus of the invention. The image formation apparatus shown in FIG. 9 corresponds to one embodiment of the fourth and fifth image formation apparatus of the invention.

In FIG. 9, an image support is a photoconductive drum 301 using an organic photoconductor, etc. This photoconductive drum 301 is rotated in the arrow direction by drive means (not shown). The photoconductive drum 301 has a surface charged to a predetermined potential by a charging roll 302 coming in contact with the surface of the photoconductive drum 301.

Then, image exposure output in response to image information is applied to the surface of the photoconductive drum 301 from a laser writer using an LED array head 303, etc., for applying a light source to original paper (not shown) and applying laser light corresponding to the original paper to the photoconductive drum 301 by means of a mirror, thereby forming an electrostatic latent image on the photoconductive drum 301.

The electrostatic latent image formed on the photoconductive drum 301 is developed into a toner image by a developing roll 307 using toner supplied from a toner cartridge 306, then the toner image is transferred by charging of a transfer roll 309 onto copy paper 311 inverted at a predetermined timing. The transfer roll 309 is energized with a constant current as a transfer current. The transfer roll 309 corresponds to one example of the first or second semiconductive roll of the invention.

The copy paper 311 to which the toner image is transferred is transported to a fuser (not shown) and the toner image is fixed to complete an image. The remaining toner on the surface of the photoconductive drum 301 where the toner image transfer step is complete is removed by a cleaning roll 312, etc., and the photoconductive drum 301 is used for the next image formation process.

The five embodiments of the image formation apparatus of the invention have been described with reference to FIGS. 5 to 9, but the image formation apparatus of the invention are not limited to the embodiments previously described with reference to FIGS. 5 to 9 and the invention can also be applied to a tandem-type color image formation apparatus, etc., comprising a plurality of image supports each comprising developing machines provided in a one-to-one correspondence with colors arranged on an intermediate transfer body in series.

Figure 10:
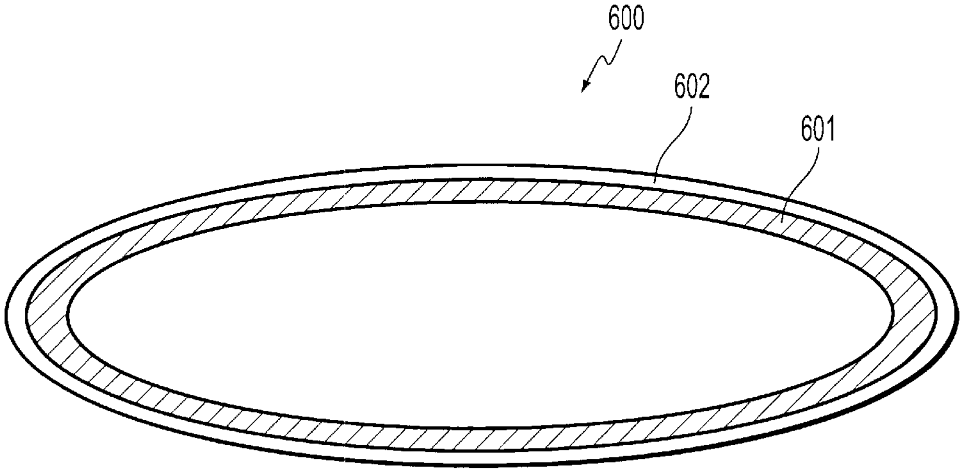
FIG. 10 is a drawing to show the configuration of one embodiment of a first semiconductive belt of the invention.

FIG. 10 is a drawing to show the configuration of one embodiment of the first semiconductive belt of the invention.

A semiconductive belt 600 shown in FIG. 10 is an endless belt and is made up of a base material 601 made of a thermoplastic elastomer composition and a surface layer 602 made of a low surface energy layer formed on the surface of the base material 601. Detailed examples of the thermoplastic elastomer composition and the low surface energy layer have already been described.

Figure 11:
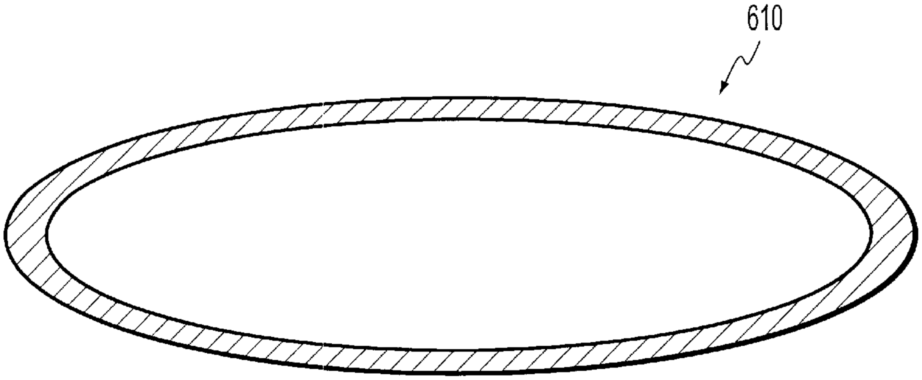
FIG. 11 is a drawing to show the configuration of one embodiment of a second semiconductive belt of the invention.

FIG. 11 is a drawing to show the configuration of one embodiment of the second semiconductive belt of the invention.

A semiconductive belt 610 shown in FIG. 11 is an endless belt and is formed of a thermoplastic elastomer composition. Detailed example of the thermoplastic elastomer composition has already been described.

FIGS. 12A to 12D are drawings to show different forms of the first semiconductive rolls of the invention.

Figure 12A:
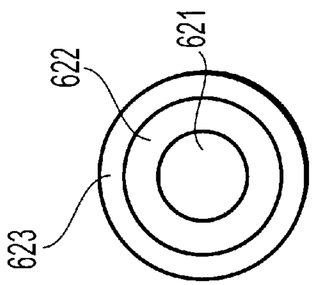
FIGS. 12A to 12D are drawings to show different forms of first semiconductive rolls of the invention.

In FIG. 12A, the first semiconductive roll comprises a metal core 621, a conductive foam layer 622 surrounding the metal core 621, and an elastic layer 623 made of a thermoplastic elastomer composition surrounding the conductive foam layer 622.

Figure 12B:
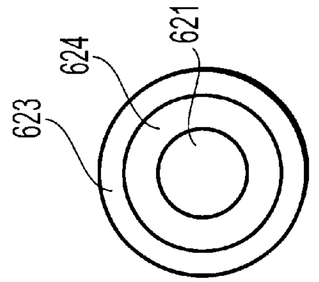

The first semiconductive roll in FIG. 12B differs from that in FIG. 12A in that it comprises an insulating foam layer 624 in place of the conductive foam layer 622 of the first semiconductive roll in FIG. 12A.

Figure 12C:
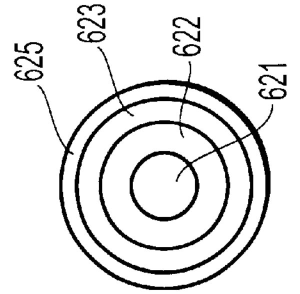
Figure 12D:
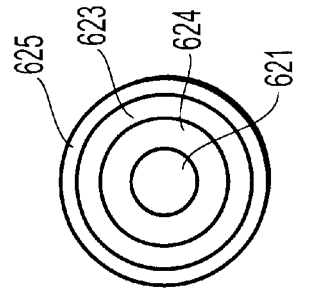

The first semiconductive roll in FIGS. 12C, 12D differs from that in FIGS. 12A, 12B in that it is formed with a surface layer 625 made of a low surface energy layer on the elastic layer 623 of the first semiconductive roll in FIG. 12A, the elastic layer 624 of the first semiconductive roll in FIG. 12B.

Detailed examples of the metal core 621, the conductive foam layer 622, the elastic layers 623 and 624, and the low surface energy layer 625 have already been described.

As shown in FIGS. 12A to 12D, various forms of the first semiconductive rolls of the invention are possible.

Figure 13A:
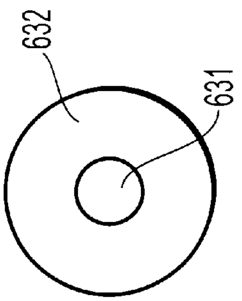
FIGS. 13A and 13B are drawings to show different forms of second semiconductive rolls of the invention.
Figure 13B:
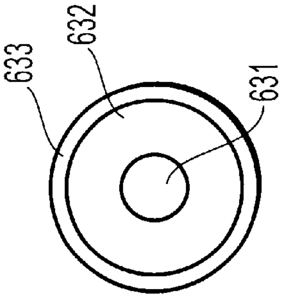

FIGS. 13A and 13B are drawings to show different forms of the second semiconductive rolls of the invention.

The semiconductive roll shown in FIG. 13A comprises a metal core 631 and a thermoplastic elastomer member 632 surrounding the metal core 631. The semiconductive roll shown in FIG. 13B differs from that in FIG. 13A in that it is formed with a resistance layer 633 on the surface of the thermoplastic elastomer member 632.

Detailed examples of the metal core 631, the thermoplastic elastomer member 632, and the resistance layer 633 have already been described.

EXAMPLES

The invention will be discussed specifically with examples shown. For examples of the belts, the application example in the image formation apparatus previously described with reference to FIG. 5 is adopted as the belt size. For examples of the rolls, the thermoplastic elastomer formula and the lay configuration in the charging roll can also be used as those in the transfer roll and the thermoplastic elastomer formula and the lay configuration in the transfer roll can also be used as those in the charging roll; application of the example semiconductive rolls shown below is not limited to charge or transfer rolls.

Examples of the first and second semiconductive belts of the invention and the first and second semiconductive rolls of the invention will be discussed in order:

First Semiconductive Belt

Examples 1 to 6 and Control Examples 1 to 12)

(Preparation of Rubber Composition)

Each rubber composition listed in Table 1 was mixed for three minutes at initial temperature 40° C. with an enclosed Banbury mixer, was prepared, and was put into a sheet by means of a roll, then was put into a pellet with a rubber pelletizer.

The provided rubber pellet was put into a sheet with a press for 10 minutes at 200° C. and volume resistivity was measured. Table 1 lists the measurement values.

[Table 1]

In Table 1,

EPDX: Mitsui EPT4021 (manufactured by Mitsui Sekiyn Kagaku) Modified XIR: Exxpro89-1 (manufactured by Exxon Kagaku) Liquid rubber: Roucant HC100 (manufactured by Mitsui Kagaku) Antioxidant. Irganox 1010 (manufactured by Nihon Ciba-Geigy)

ketjen black: ketjen EC (manufactured by Lion Akzo Co., Ltd.)

FT: Asahi thermal (manufactured by Asahi Carbon), oil absorption amount 0.3 cc/g GPF: Seest V (manufactured by Tokai Carbon), oil absorption amount 0.9 cc/g Phenol bromide: Tackroll 250-1 (manufactured by Taoka-Kagaku)

(Preparation of Thermoplastic Elastomer Composition)

Next, in each formula listed in Tables 2 to 5, a rubber pellet and a resin pellet are entered in a twin-screw kneader and are melted and kneaded, whereby rubber component dispersed as domain in a resin component as a matrix was dynamically cross-linked and a thermoplastic elastomer composition for a semiconductive belt was prepared. The kneading conditions are as follows: Kneading temperature was 200° C. to 320° C., kneading time was about three minutes, and shearing speed was about 1000 seconds$^{-1}$. The provided composition was water-cooled and was put into a pellet with a resin pelletizer.

[Table 2]

[Table 3]

[Table 4]

[Table 5]

In Tables 2 to 5,

Amorphous nylon 1: Novamid X21-S04 (manufactured by Mitsubishi Engineering Plastics)

Young's modulus 3000 MPa

Amorphous nylon 2: Novamid X21-F07 (manufactured by Mitsubishi Engineering Plastics)

Young's modulus 3000 MPa

PI; NEW-TPI450 (manufactured by Mitsui Kagaku)

Young's modulus 3200 MPa

PES: VICTREX 4100G (manufactured by Mitsui Kagaku)

Young's modulus 3400 MPa

PPS: Torerina A900-X01 (manufactured by Toray)

Young's modulus 3500 MPa

PBT: Torecon 1401-X06 (Manufactured by Toray)

Young's modulus 2000 MPa

PP: RS511Y (manufactured by Tokuyama)

Young's modulus 320 MPa (Molding of Belt)

The provided thermoplastic elastomer composition was molded like a pipe shape 0.3 mm thick with an outer diameter of 168 mm by cylindrical molding from a single-screw extruder and then was cut in 350-mm width to form endless belts.

Then, in each of Embodiments 1 to 11, a coat (20 μm thick) of emularon JYL601ESD of Acheson Japan Limited comprising carbon black dispersed in water emulsion paint containing PTFE (polytetrafluoroethylene) resin was applied to the belt surface to form a two-layer belt.

The provided belts are subject to the following test: (Tables 2 to 5 also list the test results.)

(1) Young's modulus: The belt was stamped into JIS3 shape in conformance with JIS K6251 and was subject to a tension test. A tangent is drawn on the curve of the initial distortion region of the provided stress distortion curve and Young's modulus was found from the gradient.

Volume resistivity and variations in volume resistivity: To measure the volume resistivity, using the ring electrode shown in FIG. 3 (HR probe of high-rester IP manufactured by Mitsubishi Yuka), a voltage of 100 V was applied and the volume resistivity was found from the current value in 30 minutes after the voltage was applied. To measure the variations, the prepared belt 168 mm in outer diameter and 350 mm in width was divided into eight pieces in the length direction and three pieces in the width direction, volume resistivity was measured at 24 points in the belt plane, volume resistivity logarithm was found, and the difference between the maximum and minimum values was adopted as the variation (ΔR).

(2) Water contact angle: As shown in FIG. 4, a water drop was placed on the prepared belt surface and contact angle with the belt, θ, was measured.

(3) Dimension change: Vertical load is put on the prepared belt in 1 kg/300 mm wide and dimension change was measured.

(4) Image quality density inconsistencies: Using the image formation apparatus shown in FIG. 5, a halftone image (magenta 30%) was transferred fully using the prepared belt, and color unevenness was observed by a visual inspection.

The determination is ○: No color unevenness

Δ: No problem on image quality although slight color unevenness is indicated

X: Color unevenness is indicated and a problem on image quality is involved (5) Durability: Using the image formation apparatus shown in FIG. 5, the prepared belt was rotated 10 K times at process speed of 220 mm/sec and was checked for anomaly after the belt was rotated 10 K times.

The determination is ○: No anomaly

X: Anomaly (6) Secondary transfer property: Evaluation was made based on secondary transfer percentage of magenta 100%.

The determination is ○: Transfer percentage 95% or more

Δ: Transfer percentage 85% to less than 95%

X: Transfer percentage less than 85%

In Tables 2 to 5, in Control example 1, the rubber blend percentage was large (85.9 vol %) and the resin and rubber are inverted in phase during kneading and thermoplastic elastomer composition was unable to be formed.

In Control example 2, the rubber blend percentage was small (5.3 vol %), the volume resistivity became high ($3.5\times10^{14}$ Ω cm), and the electrostatic force for holding charges was large, thus a problem of charges remaining still after a multiple transfer image on the intermediate transfer body was transferred to record paper occurred.

In Control example 3, resin material having a small Young's modulus of 230 MPa was used as a matrix, thus belt dimension change occurred because of belt tension and a durability problem was involved.

In Control example 4, the rubber volume resistivity was high ($6.1\times10^{9}$ Ω cm), thus the volume resistivity became high ($4.2\times10^{14}$ Ω cm) and the electrostatic force for holding charges was large, thus a problem of charges remaining still after a multiple transfer image on the intermediate transfer body was transferred to record paper occurred.

In Control example 5, the ratio between the viscosity of thermoplastic resin ($\eta_m$) and the viscosity of the rubber component not cross-linked or being cross-linked ($\eta_r$), ($\eta_r/\eta_m$), was 0.4, thus in-plane variations in volume resistance because of a poor dispersion state of the rubber component became large (1.1 orders of magnitude (logΩ cm)). The transfer image quality involved inconsistencies in density.

In Control example 6, the ratio between the viscosity of thermoplastic resin ($\eta_m$) and the viscosity of the rubber component not cross-linked or being cross-linked ($\eta_r$), ($\eta_r/\eta_m$), was 0.5, thus in-plane variations in volume resistivity because of a poor dispersion state of the rubber component are 0.9 orders of magnitude (logΩ cm) (no problem although slight color unevenness was indicated on the image quality). The water contact angle was 80 degrees and a slight problem was involved in the transfer property.

In Control examples 7 to 12, variations in volume resistivity are small and belt dimension change caused by belt tension did not occur, but the water contact angle on the belt surface was 80 degrees and a slight problem was involved in the secondary transfer property.

In Control example 13, rubber blend 7 using carbon black having a low structure of oil absorption amount 0.3 cc/g was used and the rubber volume resistivity was high ($1.2\times10^{8}$ Ω cm), thus the volume resistivity became high ($2\times10^{14}$ Ω cm) and the electrostatic force for holding charges was large, thus a problem of charges remaining still after a multiple transfer image on the intermediate transfer body was transferred to record paper occurred.

In Example 1, the thermoplastic elastomer composition of Control example 6 was used as a base material and the surface was coated with a surface layer of fluorine resin family 20 μm thick. The water contact angle became 95 degrees (low surface energy), the secondary transfer percentage was improved, and higher image quality was provided.

In Examples 2 to 6, the thermoplastic elastomer compositions of Control examples 7 to 11 are used as base materials and each surface was coated with a surface layer of fluorine resin family 20 μm thick. The water contact angle became 95 degrees (low surface energy), the secondary transfer percentage was improved, and higher image quality was provided.

Second Semiconductive Belt

Examples 12 to 21 and Control Examples 14 to 17

(Preparation of thermoplastic elastomer composition)

In the formula listed in Table 7, various molded particles ate manufactured as follows:

First, each rubber composition listed in Table 6 was mixed for three minutes at initial temperature 40° C. with an enclosed Banbury mixer, the rubber component was prepared, and the rubber composition was put into a sheet by means of a roll, then was put into a pellet with a rubber pelletizer.

The provided rubber pellet was put into a sheet with a press for 10 minutes at 200° C. and volume resistivity was measured. Table 6 lists the measurement values.

Next, in each formula listed in Tables 7 and 8, a rubber pellet and a resin pellet are entered in a twin-screw kneader and are melted and kneaded, whereby rubber component dispersed as domain in a resin component as a matrix was dynamically cross-linked and a thermoplastic elastomer composition for a semiconductive belt was prepared. The kneading conditions are as follows: Kneading temperature was 200° C. to 320° C., kneading time was about three minutes, and shearing speed was about 1000 seconds$^{-1}$. The provided composition was water-cooled and was put into a pellet with a resin pelletizer.

(Molding of belt)

The provided thermoplastic elastomer composition was molded like a pipe shape 0.2 mm thick with an outer diameter of 150 mm by cylindrical molding from a single-screw extruder and then was cut in 350-mm width to form belts.

Then, the belts are subject to the following test:

(Tables 7 and 8 also list the test results.)

(1) Young's modulus: The belt was stamped into JIS3 shape in conformance with JIS K6251 and was subject to a tension test. A tangent is drawn on the curve of the initial distortion region of the provided stress distortion curve and Young's modulus was found from the gradient.

(2) Volume specific resistance value and variations: The prepared belt was cut at 30-mm intervals in the length direction and in the width direction, volume specific resistance value logarithm was found at arbitrary 10 points in conformance with JIS K6911, and the difference between the maximum and minimum values was shown as the variation (ΔR).

(3) Dimension change: Vertical load is put on the belt in 1 kg/300 mm wide and dimension change was measured.

(4) solid print density variations: The manufactured belt was used as the transfer belt portion in the structure of the image formation apparatus shown in FIG. 8, solid printing was executed, and color unevenness was observed by a visual inspection.

○: No color unevenness

Δ: No problem on image quality although slight color unevenness is indicated

X: Color unevenness is indicated and image quality is degraded (5) Durability: The belt was rotated 10,000 times and was checked for anomaly after the belt was rotated 10,000 times.

○: No anomaly

X: Anomaly

[Table 6]

Table 6 Note

EPDM: Mitsui EPT4021 (manufactured by Mitsui Sekiyu Kagaka) Modified IIR: Exxpro89-1 (manufactured by Exxon Kagaku) Liquid-rubber: Roucant HC100 (manufactured by Mitsui Kagaku) Antioxidant: Irganox 1010 (manufactured by Nihon Ciba-Geigy)

ketjen black: ketjen EC (manufactured by Lion Akzo Co., Ltd.)

GPF: Seest V (manufactured by Tokai Carbon), oil absorption amount 0.9 cc/g

Phenol bromide: Tackroll 250-1 (manufactured by Taoka Kagaku)

[Table 7]

[Table 8]

Amorphous nylon 1: Novamid X21-S04 (manufactured by Mitsubishi Engineering Plastics), Young's modulus 3000 MPa Amorphous nylon 2: Novamid X21-F07 (manufactured by Mitsubishi Engineering Plastics), Young's modulus 3000 MPa PES: VICTREX 4100G (manufactured by Mitsui Kagaku), Young's modulus 3400 MPa PPS: Torerina A900-X01 (manufactured by Toray), Young's modulus 3500 MPa PI: NEW-TPI450 (manufactured by Mitsui Kagaaku), Young's modulus 3200 MPa PBT: Torecon 1401-X06 (manufactured by Toray), Young's modulus 2000 MPa.

PP: RS511Y (manufactured by Tokuyana), Young's modulus 320 MPa

First Semiconductive Roll

Examples 22 to 34 and Control Examples 18 to 25

(Preparation of rubber composition)

Each rubber composition listed in Table 9 was mixed for three minutes at initial temperature 40° C. with an enclosed Banbury mixer, was prepared, and was put into a sheet by means of a roll, then was put into a pellet with a rubber pelletizer.

The provided rubber pellet was put into a sheet shape 5 mm thick with a press for 10 minutes at 200° C. and volume resistivity was measured. Table 9 lists the measurement results.

[Table 9]

In Table 9,

EPDM: Mitsui EPT4021 (manufactured by Mitsui Sekiyu Kagaku) Modified IIR: Exxpro89-1 (manufactured by Exxon Kagaku) Liquid rubber: Roucant EC100 (manufactured by Mitsui Kagaki) Antioxidant: Irgarnox 1010 (manufactured by Nihon Ciba-Geigy)

ketjen black: ketjen EC (manufactured by Lion Akzo Co., Ltd.)

GPF: Seest V (manufactured by Tokai Carbon), oil absorption amount 0.9 cc/g

FT: Asahi thermal (manufactured by Asahi Carbon), oil absorption amount 0.3 cc/g Phenol bromide: Tackroll 250-1 (manufactured by Taoka Kagaku)

(Preparation of thermoplastic elastomer composition)

Next, in each formula listed in Tables 10 to 13, a rubber pellet and a resin pellet are entered in a twin-screw kneader and are melted and kneaded, whereby rubber component dispersed as domain in a resin component as a matrix was dynamically cross-linked and a thermoplastic elastomer composition for a semiconductive belt was prepared. The kneading conditions are as follows: Kneading temperature was 200° C. to 320° C., kneading time was about three minutes, and shearing speed was about 1000 seconds$^{-1}$. The provided composition was water-cooled and was put into a pellet with a resin pelletizer.

[Table 10]

[Table 11]

[Table 12]

[Table 13]

In Tables 10 to 13,

PER1: PER/M142E (manufactured by Tokuyama)

100% tensile elastic modulus, 3.3 MPa

PER2: PER/M110E (manufactured by Tokuyama)

100% tensile elastic modulus, 6.7 MPa

SEPS: Septon 2002 (manufactured by Kurare)

100% tensile elastic modulus, 3.7 MPa

PAE: Pebacks 2533 (manufactured by Atochem)

100% tensile elastic modulus, 8.2 MPa

COPE: Bellbyrene P150B (manufactured by Toyobo)

100% tensile elastic modulus, 50 MPa

PET: EMC560 (manufactured by Toyobo)

100% tensile elastic modulus 95 MPa

The 100% tensile elastic modulus was measured with a sheet-like molded article.

(Molding underlying foam layer)

Using EPDM EP33 manufactured by Nihon Gousei Gomu (Kabu) as raw material of underlying foam layer, a foaming agent and black as conductive carbon black are loaded and a kneader and a roll mill are used for kneading, then the kneaded raw material was extruded like a tube by an extruder and a vulcanizer was used to execute foam vulcanization at a temperature of 160° C. by vapor pressure of 5 KG/cm$^2$. Further, a metal core was press-fitted into the foam layer foamed and vulcanized as mentioned above, then the outer shape of the foam layer was ground and the core material was coated with the foam layer.

The volume resistivity of the roll coated with the foam layer was $10^6$ Ω cm and the roll hardness was 20 degrees as ASKER C hardness.

(Manufacturing of roll)

(1) Charging roll: Examples 22 to 24, Examples 31, 32, and 34, Control examples 18 to 20, and Control examples 23 to 25

A shaft 6 mm in diameter and 330 mm in length comprising nickel-plated iron with a roll as a core was coated with a conductive foam layer having volume resistivity $10^6$ Ω cm to form a roll 10 mm in diameter and the roll was coated with a thermoplastic elastomer composition in each of Examples 22 to 24 listed in Table 10 by extruding and was ground to the outer diameter 14 mm and further a coat (20 μm thick) of emularon JYL601ESD of Acheson Japan Listed comprising carbon black dispersed in water emulsion paint containing PTFE (polytetrafluoroethylene) resin was applied to the surface of the roll to form a three-layer conductive roll.

(2) Transfer roll: Examples 25 to 30, Example 33, and Control Examples 21 and 22

A shaft 12 mm in diameter and 330 mm in length comprising nickel-plated iron with a roll as a core was coated with a conductive foam layer having volume resistivity $10^6$ Ω cm to form a roll 24 mm in diameter and the roll was coated with a thermoplastic elastomer composition listed in Tables 10 to 13 by extruding and was ground to the outer diameter 28 mm to provide a two-layer semiconductive roll. Further, in Examples 25 to 28, a coat (20 μm thick) of emularon JYL601ESD of Acheson Japan Limited comprising carbon black dispersed in water emulsion paint containing PTFE (polytetrafluoroethylene) resin was applied to the surface of the roll to form a three-layer conductive roll.

The provided thermoplastic elastomer compositions and rolls are subject to the following test: (Tables 10 to 13 also list the test results.)

(Thermoplastic elastomer)

(1) JIS A hardness: Hardness was measured in conformance with JISK 6301.

(2) Volume resistivity: Using the ring electrode shown in FIG. 3 (HR probe of high-rester IP manufactured by Mitsubishi Yuka), a voltage of 100 V was applied and the volume resistivity was found from the current value in 30 minutes after the voltage was applied. To measure the variations in volume resistivity, a sheet molded 500 mm in length, 350 mm in. width, and 2 mm in thickness was divided into ten pieces in the length direction and five pieces in the width direction, volume resistivity was measured at 50 points in the sheet plane, volume resistivity logarithm was found, and the difference between the maximum and minimum values was adopted as the variation (ΔR).

To measure the volume resistivity, 100 V was applied between the electrode 311 inside the ring electrode 310 shown in FIG. 3 and the metal plate 314 below the measured object. 313 formed like a sheet, the current value was measured in 30 minutes after 100 V was applied, and the volume resistivity of the measured object 313 was found by calculation from the measured current value.

(Roll)

(1) ASKER C hardness: The ASKER C hardness was measured using an ASKER C hardness meter in conformance with a JISK 6301. After 1-kg load was applied for 10 seconds, the numeric value was adopted as measurement value.

Figure 14:
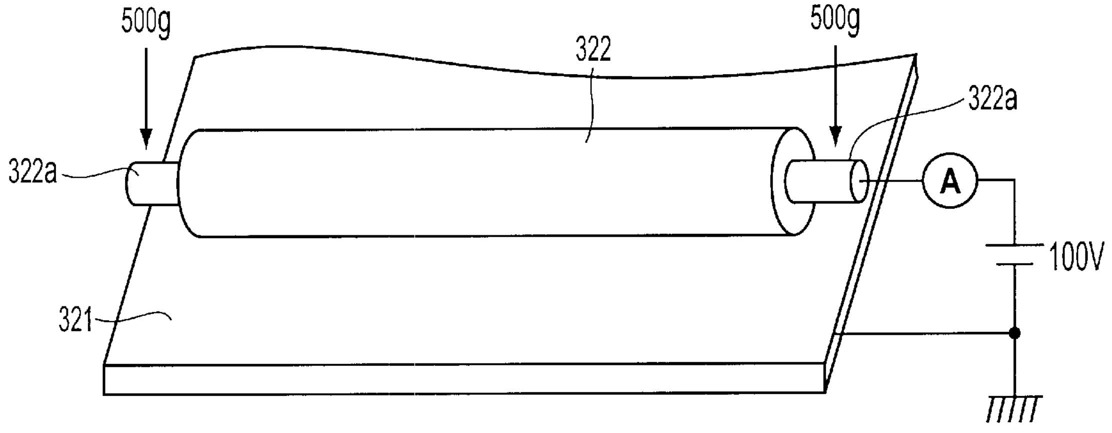
FIG. 14 is a drawing to show a measuring method of volume resistivity of a roll.

(2) Volume resistivity: A measuring apparatus shown in FIG. 14 was used. That is, a measured roll 322 is placed on a metal plate 321, 500-g load is put on both ends of a shaft *322a* of the roll 322, 100 V was applied between the metal plate 321 and the shaft *322a*, the current value was measured in 10 minutes after 100 V was applied, and the volume resistivity of the roll 322 was found from the measured current value. Here, the roll 322 was rotated 90 degrees at a time and the four measurement values are averaged.

Figure 15:
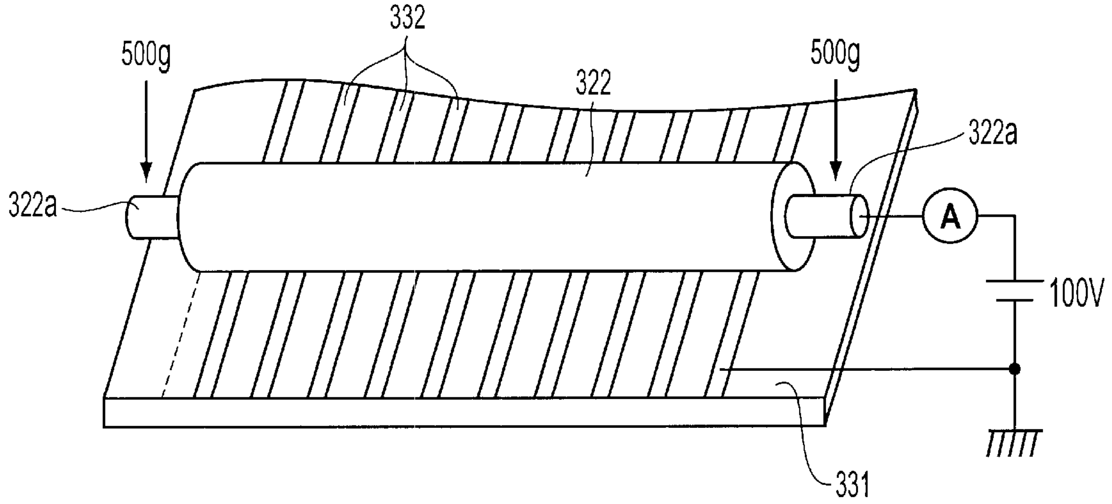
FIG. 15 is a drawing to show a measuring method of volume resistivity of a roll with the roll divided into 40 pieces.

To measure the variations in volume resistivity, a measuring apparatus shown in FIG. 15 was used. The roll was divided into ten pieces in the axial direction and four pieces in the circumferential direction for dividing the roll plane into 40 pieces, resistance values are found, logarithm was found, and the difference between the maximum and minimum values was found. Here, as shown in FIG. 15, a plastic plate 331 on which copper tapes 322 each 10 mm wide are put was used in place of the metal plate 321 in FIG. 14. A voltage of 100 V was applied between the shaft *322a* of the roll 322 and each copper tape 332 in order, each current value was measured, each resistance value was found, and while the roll 322 was rotated 90 degrees at a time, the process was repeated for providing a total of 40 resistance values. The copper tapes are equally spaced from each other at 23-mm intervals.

(3) Water contact angle: A water drop was placed on the prepared roll surface and contact angle with the roll was measured.

(4) Fogging property: The image formation apparatus shown in FIG. 7 was used. The manufactured roll was used as a charging roll and whether or not fogging occurred on print characters (charge unevenness) was checked.

The determination was ○: No fogging

X: Fogging occurred and a problem on image quality was involved (5) Color unevenness: The image formation apparatus shown in FIG. 5 was used. The manufactured conductive roll was used as a transfer roll 3, a halftone image (magenta 30%) was transferred fully, and color unevenness was observed by a visual inspection.

The determination is ○: No color unevenness

X: Color unevenness is indicated and a problem on image quality is involved.

(6) Toner dirt: After 1000 sheets of paper are printed using charge and transfer rolls, whether or not toner dirt occurred was determined by observing the surfaces of the rolls.

The determination is ○: No toner dirt

X: Toner dirt

In Tables 10 and 11, in Control example 18, the rubber blend percentage was large (94 vol %) and the rubber and resin are inverted in phase during kneading and thermoplastic elastomer composition was unable to be formed.

In Control example 19, the rubber blend percentage was small (4.1 vol %) and the volume resistivity became high ($7.0 \times 10^{13}$ Ω cm). To use the roll as a charging roll, uniform charging cannot be accomplished and fogging occurred.

In Control example 20, the 100% tensile elastic modulus of resin component was large (95 MPa) and thus the JIS hardness of thermoplastic elastomer became 85 and uniform nip cannot be maintained under predetermined nip pressure. Thus, a charge failure occurred and on the image quality, fogging occurred.

In Control example 21, because of rubber component only, the variations in volume resistivity of the roll are large (1.7 orders of magnitude) and thus transfer unevenness occurred.

In Control example 22, the ratio between the viscosity of thermoplastic resin ($\eta_m$) and the viscosity of the rubber component not cross-linked or being cross-linked ($\eta_r$), ($\eta_r/\eta_m$), was 0.4, thus in-plane variations in volume resistivity because of a poor dispersion state of the rubber component became large (1.4 orders of magnitude (logΩ cm)). Density unevenness was involved in the image quality.

In Control example 23, a charging roll comprising a foam layer and an elastic layer coated with a surface layer of urethane family was applied as with Example 22. In the initial image quality, an image quality problem of fogging, etc., did not occur, but toner deposition was indicated on the roll surface after printing 1000 sheets of paper. If the toner deposition is increased, it will cause a charge failure to occur.

In Control example 24, rubber blend 5 having volume resistivity of $3 \times 10^5$ Ω cm was used and thus the volume resistivity of the roll became high ($2 \times 10^{13}$ Ω cm). To use the roll as a charging roll, uniform charging cannot be accomplished and fogging occurred.

In Control example 25, rubber blend 7 using carbon black having a low structure of oil absorption amount 0.3 cc/g was used and the rubber volume resistivity was high ($1.2\times10^8$ Ω cm), thus the volume resistivity of the roll became high ($2\times10^{13}$ Ω cm). To use the roll as a charging roll, uniform charging cannot be accomplished and fogging occurred.

In Examples 22 to 24, Examples 31 and 32, and Example 34, as a result of using each roll as a charging roll, the variations in volume resistivity are small, charge unevenness, etc., did not occur, and the surface was coated with a fluorine family material of low surface energy. Thus, a problem of toner dirt, etc., was not involved.

In Examples 25 to 28 and Example 33, as a result of using each roll as a transfer roll, the variations in volume resistivity are small, color unevenness, etc., did not occur, and the surface was coated with a fluorine family material of low surface energy. Thus, a problem of toner dirt, etc., was not involved.

In Examples 29 and 30, the rolls are limited to applications wherein each roll is placed on the belt rear of toner transfer face with no problem of dirt occurrence, but the variations in volume resistivity are small and color unevenness, etc., did not occur.

Second Semiconductive Roll

Examples 35 to 42 and Control Examples 26 to 29

(Manufacturing of thermoplastic elastomer composition)

In the formulas listed in Tables 14 and 15, various molded particles are manufactured as follows:

First, each rubber composition listed in Table 6 was mixed for three minutes at initial temperature 40° C. with an enclosed Banbury mixer, the rubber component was prepared, and the rubber composition was put into a sheet by means of a roll, then was put into a pellet with a rubber pelletizer.

The provided rubber pellet was put into a sheet with a press for 10 minutes at 200° C. and volume resistivity was measured. Table 6 also lists the measurement values.

Next, in each formula listed in Tables 14 and 15, a rubber pellet and a resin pellet are entered in a twin-screw kneader and are melted and kneaded, whereby rubber component dispersed as domain in a resin component as a matrix was dynamically cross-linked and a thermoplastic elastomer composition for a semiconductive roll was prepared. The kneading conditions are as follows: Kneading temperature was 200° C., kneading time was about three minutes, and shearing speed was about 1000 $seconds^{-1}$. The provided composition was water-cooled and was put into a pellet with a resin pelletizer.

(Manufacturing of Roll)

A shaft 10 mm in diameter and 250 mm in length comprising nickel-plated iron was used as a roll core. It was previously inserted into a metal mold and each thermoplastic elastomer composition in Examples 35 to 42 and Control examples 26 to 28 was applied to the outer periphery of the core by injection molding.

The roll undergoing the injection molding was ground and a coating material of urethane paint (SC0100 manufactured by Nihon Beechemical) was applied to the surface of the roll. However, the coating was not executed in Example 36.

The finish roll has the dimensions of a diameter of 18 mm and a roll length of 210 mm.

Then, the rolls are subject to the following test:
(Tables 14 and 15 also list the test results)

(Thermoplastic elastomer)

(1) JIS A hardness: The hardness of each roll was measured in conformance with JISK 6301.

(2) Volume specific resistance value, variations in resistance value: A voltage of 100 VDC was applied to the core, volume specific resistance value was measured at arbitrary 10 points on the roll, and the 10 volume specific resistance values are averaged. Volume specific resistance value logarithm was found and the difference between the maximum and minimum values was indicated as log variation (R).

(3) Fogging property: Each of the rolls manufactured in the examples and the control examples was used as the charging roll portion in the structure of the image formation apparatus shown in FIG. 9, consecutive printing was executed using polymerization capsule toner shaped like a ball, and whether or not fogging occurred in a white solid print portion was examined under a microscope.

○: No fogging

Δ: No problem on image quality although slight fogging occurs

X: Fogging occurs and image quality is degraded (4) Print density: Black solid printing was executed and color unevenness was observed by a visual inspection.

○: No color unevenness

Δ: No problem on image quality although slight color unevenness is indicated

X: Color unevenness is indicated and image quality is degraded

Control Example 29

Rubber blend 3 was wound around a shaft similar to that used in the above-described examples and press molding was executed for 30 minutes at 150° C., thereby manufacturing a roll.

The roll was ground and was painted with urethane and was subject to a test as in the above-described examples.

[Table 14]

[Table 15]

[Table 14 and 15 Note]

PER1: PER M142E (manufactured by Tokuyama), 100% tensile elastic modulus 3.3 MPa PER2: PER R110E (manufactured by Tokuyama), 100% tensile elastic modulus 6.7 MPa SEPS: Septon 2002 (manufactured by Kurare), 100% tensile elastic modulus 3.7 MPa PAE: Pebacks 2533 (manufactured by Atochem), 100% tensile elastic modulus 8.2 MPa PET: EMC560 (manufactured by Toyobo), 100% tensile elastic modulus 95 MPa

[Advantages of the Invention]

As described above, according to the invention, semiconductive members such as a semiconductive belt and a semiconductive roll improved in uniformity of electric resistance with less change in electric resistance depending on the environment can be provided and further an image formation apparatus that can provide high-quality images stably can be provided.

What is claimed is:

1. A semiconductive member having a portion formed of a thermoplastic elastomer composition comprising:

a thermoplastic resin as a matrix, and rubber particles at least some of which have conductivity and at least some of which are cross-linked as domain.

2. The semiconductive member as claimed in claim 1, wherein the ratio between viscosity of the thermoplastic resin, $\eta_m$, and viscosity of a rubber component forming the rubber particles when the rubber component is not cross-linked or is being cross-linked, $\eta_r$, is $$0.5<\eta_r/\eta_m<1.5$$

3. The semiconductive member as claimed in claim 1, wherein the thermoplastic resin is made of at least one resin selected from the group consisting of polyamide family resin, polyester family resin, polyimide family resin, polysulfide family resin, polysulfone family resin, styrene family resin, olefin family resin, and urethane family resin.

4. The semiconductive member as claimed in claim 1, wherein the rubber particles contain ketjen black and carbon black with an oil absorption amount of 0.5 cc/g or more.

5. A semiconductive belt having a base material and a surface layer, wherein the base material is formed of a thermoplastic elastomer composition comprising an insulating thermoplastic resin as a matrix, and rubber particles at least some of which have conductivity and at least some of which are cross-linked as domain, said semiconductive belt having a Young's modulus of 500 MPa or more and volume resistivity of $10^7$ to $10^{13}$ Ω cm.

6. A semiconductive belt having a thermoplastic elastomer member formed of a thermoplastic elastomer composition having a thermoplastic resin as a matrix and rubber particles at least some of which are cross-linked as domain, and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ Ω cm, and variations in volume specific resistance value (R) being within to the power of one.

7. The semiconductive member as claimed in claim 5, wherein the thermoplastic resin has a Young's modulus of 1000 MPa or more, the rubber particle has volume resistivity of $10^7$ Ω cm or less, and the thermoplastic elastomer composition has a volume fraction of thermoplastic resin/rubber particles=30/70 to 90/10 between the thermoplastic resin and the rubber particles.

8. The semiconductive member as claimed in claim 5, wherein the ratio between viscosity of the thermoplastic resin, $\eta_m$, and viscosity of a rubber component forming the rubber particles when the rubber component is not cross-linked or is being cross-linked, $\eta_r$, is $$0.5<\eta_r/\eta_m<1.5.$$

9. The semiconductive belt as claimed in claim 5, wherein the thermoplastic resin is made of at least one resin selected from the group consisting of polyamide family resin, polyester family resin, polyimide family resin, polysulfide family resin, and polysulfone family resin.

10. The semiconductive belt as claimed in claim 5, wherein the rubber particles contain ketjen black and carbon black with an oil absorption amount of 0.5 cc/g or more.

11. The semiconductive belt as claimed in claim 5, wherein the surface layer is a low surface energy layer made of a material having lower surface energy than the base material.

12. The semiconductive belt as claimed in claim 11, wherein the surface layer is made of a material consisting essentially of fluorine family resin or a material comprising fluorine family resin powder dispersed.

13. The semiconductive belt as claimed in claim 5 being molded by cylindrical molding.

14. A semiconductive roll comprising:

a core, a foam surrounding the core, and an elastic layer formed of a thermoplastic elastomer composition comprising an insulating thermoplastic resin as a matrix and rubber particles at least some of which have conductivity and at least some of which are cross-linked as domain, surrounding the foam, and having ASKER C hardness of 25 to 70 degrees and volume resistivity of $10^4$ to $10^{12}$ Ω cm.

15. A semiconductive roll comprising:

a thermoplastic elastomer member formed like a cylinder on an outer periphery of a core with the thermoplastic elastomer member being formed of a thermoplastic elastomer composition having a thermoplastic resin as a matrix and rubber particles at least some of which are cross-linked as domains and comprising the rubber particles at least some of which have conductivity with the volume specific resistance value of the rubber particle being smaller than that of the thermoplastic resin, JIS A hardness being 25 to 50 degrees, the volume specific resistance value being $10^6$ to $10^{12}$ Ω cm, and variations in volume specific resistance value (R) being within to the power of one.

16. The semiconductive roll as claimed in claim 14, wherein the thermoplastic resin has a tensile elastic modulus of 50 MPa or less, the rubber particle has volume resistivity of $10^8$ Ω cm or less, and the thermoplastic elastomer composition has a volume fraction of thermoplastic resin/rubber particles=25/75 to 90/10 between the thermoplastic resin and the rubber particles.

17. The semiconductive roll as claimed in claim 15, wherein the 100% tensile elastic modulus of the matrix is 50 MPa or less, the volume specific resistance value of the domain is $10^6$ Ω cm or less, and the volume fraction of the domain to the matrix is 10/90 to 90/10.

18. The semiconductive roll as claimed in claim 14, wherein the ratio between viscosity of the thermoplastic resin, $\eta_m$, and viscosity of a rubber component forming the rubber particles when the rubber component is not cross-linked or is being cross-linked, $\eta_r$, is $$0.5<\eta_r/\eta_m<1.5.$$

19. The semiconductive roll as claimed in claim 14, wherein the thermoplastic resin is made of at least one resin selected from the group consisting of styrene family resin, olefin family resin, urethane family resin, polyamide family resin, and polyester family resin.

20. The semiconductive roll as claimed in claim 14, wherein the rubber particles contain ketjen black and carbon black with an oil absorption amount of 0.5 cc/g or more.

21. The semiconductive roll as claimed in claim 14 comprising:

a low surface energy layer made of a material having lower surface energy than the elastic layer on the elastic layer.

22. The semiconductive roll as claimed in claim 21, wherein the low surface energy layer is made of a material consisting essentially of fluorine family resin or a material comprising fluorine family resin powder dispersed.

23. An image formation apparatus for charging a predetermined photosensitive body, applying exposure light responsive to an image to the photosensitive body, forming an electrostatic latent image on the photosensitive body, developing the electrostatic latent image in toner, forming a toner image on the photosensitive body, and finally transferring the toner image onto a predetermined record medium and fixing the toner image, and forming an image made of the fixed toner image on the record medium, wherein said image formation apparatus comprises:

a semiconductive belt having a base material being formed of a thermoplastic elastomer composition comprising an insulating thermoplastic resin as a matrix and rubber particles at least some of which have conductivity and at least some of which are cross-linked as domain, and a surface layer formed on a surface of the base material, the semiconductive belt having a Young's modulus of 500 MPa or more and volume resistivity of $10^7$ to $10^{13}$ Ω cm.

24. The image formation apparatus as claimed in claim 23, wherein, the semiconductive belt is an intermediate transfer belt for receiving transfer of the toner image from the photosensitive body and transporting the transferred toner image for transfer to the record medium.

25. The image formation apparatus as claimed in claim 23, wherein the semiconductive belt is a paper transport belt for supporting the record medium and transporting the record medium via a position in contact with or in the proximity of the photosensitive body to receive transfer of the toner image from the photosensitive body on the record medium.

26. An image formation apparatus comprising:

an image support for forming an electrostatic latent image responsive to image information, a developing unit for visualizing the electrostatic latent image formed on the image support as a toner image in toner, an intermediate transfer body onto which the toner image supported on the image support is transferred, and a transfer unit for transferring the toner image transferred onto the intermediate transfer body to a record medium, wherein a material forming the intermediate transfer body has a thermoplastic elastomer member formed of a thermoplastic elastomer composition having a thermoplastic resin as a matrix and rubber particles at least some of which are cross-linked as domain and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ Ω cm, and variations in volume specific resistance value (R) being within to the power of one.

27. An image formation apparatus comprising:

an image support for forming an electrostatic latent image responsive to image information, a developing unit for visualizing the electrostatic latent image formed on the image support as a toner image in toner, a transfer material transport unit having a conductive belt for transporting a transfer material to the image support to transfer the toner image supported on the image support to the transfer material, and a transfer unit for transferring the toner image on the image support to the transfer material, wherein the conductive belt has a thermoplastic elastomer member formed of a thermoplastic elastomer composition having a thermoplastic resin as a matrix and rubber particles at least some of which are cross-linked as domain and comprising the rubber particles at least some of which have conductivity with the volume specific resistance value of the rubber particle being smaller than that of the thermoplastic resin, Young's modulus being 500 MPa or more, the volume specific resistance value being $10^6$ to $10^{13}$ Ω cm, and variations in volume specific resistance value (R) being within to the power of one.

28. An image formation apparatus for charging a predetermined photosensitive body, applying exposure light responsive to an image to the photosensitive body, forming an electrostatic latent image on the photosensitive body, developing the electrostatic latent image in toner, forming a toner image on the photosensitive body, finally transferring the toner image onto a predetermined record medium and fixing the toner image, and forming an image made of the fixed toner image on the record medium, wherein said image formation apparatus comprises:

a semiconductive roll comprising a core, a foam surrounding the core, and an elastic layer formed of a thermoplastic elastomer composition comprising an insulating thermoplastic resin as a matrix and rubber particles at least some of which have conductivity and at least some of which are cross-linked as domain, surrounding the foam, and having ASKER C hardness of 25 to 70 degrees and volume resistivity of $10^4$ to $10^{12}$ Ω cm.

29. An image formation apparatus for charging a predetermined photosensitive body, applying exposure light responsive to an image to the photosensitive body, forming an electrostatic latent image on the photosensitive body, developing the electrostatic latent image in toner, forming a toner image on the photosensitive body, finally transferring the toner image onto a predetermined record medium and fixing the toner image, and forming an image made of the fixed toner image on the record medium, wherein a semiconductive roll comprising a thermoplastic elastomer member formed like a cylinder on an outer periphery of a core with the thermoplastic elastomer member being formed of a thermoplastic elastomer composition having a thermoplastic resin as a matrix and rubber particles at least some of which are cross-linked as domains and comprising the rubber particles at least some of which have conductivity with the volume specific resistance value of the rubber particle being smaller than that of the thermoplastic resin, JIS A hardness being 25 to 50 degrees, the volume specific resistance value being $10^4$ to $10^{12}$ Ω cm, and variations in volume specific resistance value (R) being within to the power of one is used.

30. The image formation apparatus as claimed in claim 28, wherein the semiconductive roll is a charging roll for charging the photosensitive body.

31. The image formation apparatus as claimed in claim 28, wherein the semiconductive roll is a transfer roll for transferring from a toner image support supporting the toner image before transfer to a toner image support for supporting the toner image after transfer.

* * * * *